(12) United States Patent
Tsukagoshi

(10) Patent No.: US 11,368,744 B2
(45) Date of Patent: *Jun. 21, 2022

(54) DEVICE AND ASSOCIATED METHOD FOR USING LAYER DESCRIPTION AND DECODING SYNTAX IN MULTI-LAYER VIDEO

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,022

(22) Filed: Mar. 27, 2019

(65) Prior Publication Data

US 2019/0222887 A1 Jul. 18, 2019

Related U.S. Application Data

(63) Continuation of application No. 14/898,283, filed as application No. PCT/JP2014/068643 on Jul. 11, 2014, now Pat. No. 10,306,296.

(30) Foreign Application Priority Data

Aug. 9, 2013 (JP) .................................. 2013-167168
Jan. 17, 2014 (JP) .................................. 2014-007306

(51) Int. Cl.
*H04N 19/70* (2014.01)
*H04N 19/31* (2014.01)
(Continued)

(52) U.S. Cl.
CPC ......... *H04N 21/4345* (2013.01); *H04N 19/31* (2014.11); *H04N 19/423* (2014.11);
(Continued)

(58) Field of Classification Search
CPC .. H04N 21/434; H04N 21/234; H04N 21/322; H04N 21/236; H04N 21/2362;
(Continued)

(56) References Cited

U.S. PATENT DOCUMENTS 6,320,909 B1    11/2001  Takabatake
8,130,830 B2 *   3/2012  Xu .......................... H04N 19/70
                                                          375/240.08

(Continued)

FOREIGN PATENT DOCUMENTS

CN      101626510       1/2010
JP      2002 10251      1/2002
(Continued)

OTHER PUBLICATIONS

Extended European Search Report dated Dec. 17, 2019 in corresponding European Patent Application No. 19173244.5, 9 pages.

(Continued)

*Primary Examiner* — Kyle M Lotfi
(74) *Attorney, Agent, or Firm* — Oblon, McClelland, Maier & Neustadt, L.L.P.

(57) ABSTRACT

Image data of each of pictures which constitute dynamic image data is classified into a plurality of layers, image data of each of the classified layers is encoded, and a video stream having the encoded image data of the pictures of each of the layers is generated. A container in a predetermined format which includes the generated video stream is transmitted. Decoding timing information, which has been set so that a higher layer has a shorter decoding time interval of the encoded image data of each of the pictures, is added to the encoded image data of the pictures of each of the layers. The operations enable a reception side to perform a favorable decoding process commensurate with its decoding capability.

13 Claims, 35 Drawing Sheets

(51) Int. Cl.
*H04N 19/46* (2014.01)
*H04N 21/434* (2011.01)
*H04N 21/236* (2011.01)
*H04N 19/423* (2014.01)
*H04N 21/845* (2011.01)
*H04N 21/854* (2011.01)
*H04N 21/43* (2011.01)
*H04N 21/2343* (2011.01)
*H04N 21/2362* (2011.01)
*H04N 21/2365* (2011.01)
*H04N 21/4402* (2011.01)
*H04N 21/8547* (2011.01)

(52) U.S. Cl.
CPC .............. *H04N 19/46* (2014.11); *H04N 19/70* (2014.11); *H04N 21/236* (2013.01); *H04N 21/2362* (2013.01); *H04N 21/2365* (2013.01); *H04N 21/234327* (2013.01); *H04N 21/434* (2013.01); *H04N 21/43072* (2020.08); *H04N 21/440227* (2013.01); *H04N 21/8451* (2013.01); *H04N 21/8547* (2013.01); *H04N 21/85406* (2013.01)

(58) Field of Classification Search
CPC ........... H04N 21/2365; H04N 21/4307; H04N 21/440227; H04N 21/8451; H04N 21/85406; H04N 21/8547; H04N 19/15; H04N 19/147; H04N 19/63; H04N 19/37; H04N 19/115; H04N 19/70; H04N 19/423; H04N 19/30; H04N 19/44; H04N 19/58; H04N 19/43; H04N 19/31; H04N 19/46; H04N 21/234327; H04N 21/4345; H04N 19/00
USPC ..................... 725/62, 109–110, 116; 348/43; 375/240.12–240.29, 240.16, 240.25, 375/E7.027, E7.123; 382/251
See application file for complete search history.

(56) References Cited

U.S. PATENT DOCUMENTS

| | | |
|---|---|---|
| 2001/0046263 A1 | 11/2001 | Yamada |
| 2002/0191625 A1 | 12/2002 | Kelly |
| 2007/0091881 A1 | 4/2007 | Kallio et al. |
| 2007/0242895 A1 | 10/2007 | Bandou |
| 2007/0277219 A1 | 11/2007 | Toebes |
| 2008/0075172 A1 | 3/2008 | Koto |
| 2011/0026480 A1 | 2/2011 | Kim |
| 2011/0110436 A1* | 5/2011 | Schierl ............... H04N 21/2662 375/240.26 |
| 2011/0164683 A1* | 7/2011 | Takahashi ............... H04N 19/70 375/240.16 |
| 2012/0081516 A1* | 4/2012 | Tsukagoshi .......... H04N 13/194 348/43 |
| 2012/0183055 A1* | 7/2012 | Hong ................... H04N 19/187 375/240.12 |
| 2013/0101034 A1* | 4/2013 | Wahadaniah .......... H04N 19/70 375/240.12 |
| 2013/0243081 A1* | 9/2013 | Chen ....................... H04N 19/52 375/240.02 |
| 2014/0089993 A1* | 3/2014 | Huysegems ........ H04L 65/1069 725/86 |

FOREIGN PATENT DOCUMENTS

| | | |
|---|---|---|
| JP | 2004-88244 | 3/2004 |
| JP | 2005-192013 | 7/2005 |
| JP | 2006 515132 | 5/2006 |
| JP | 2007-537639 | 12/2007 |
| JP | 2008-167061 A | 7/2008 |
| JP | 2009-303059 A | 12/2009 |
| JP | 2011-35747 | 2/2011 |
| JP | 2012-100162 A | 5/2012 |
| WO | 03 075524 | 9/2003 |
| WO | 2005 011265 | 2/2005 |
| WO | 2010 032636 | 3/2010 |
| WO | WO 2011-052045 | 5/2011 |
| WO | 2012 023281 | 2/2012 |
| WO | 2012 096981 | 7/2012 |

OTHER PUBLICATIONS

Office Action dated Oct. 15, 2019 in Japanese Patent Application No. 2018-084684.
Office Action dated Feb. 12, 2020 in corresponding Japanese Patent Application No. 2020-000346, 6 pages.
"How to Enable 144 Hz Refresh Rate on ASUS VG248QE", YouTube, Aug. 23, 2017, p. 1, XP054981252, Retrieved from the Internet: URL:https://www.youtube.com/watch?v=x1-nAGSQFHM [retrieved on Dec. 23, 2020].
Sullivan et al., "Overview of the High Efficiency Video Coding (HEVC) Standard," IEEE Transactions on Circuits and Systems for Video Technology, vol. 22, No. 12, (Dec. 2012), pp. 1649-1668.
"Information Technology—Generic coding of moving pictures and associated audio information: Systems Amendment 3: Transport of HEVC video over MPEG-2 systems", URL: http://www.itsci.ipsi.or.jp/sc29/open/29view/29nt2806t.doc, (May 24, 2012), pp. 1-9.
SATO et al., "Consideration of buffer management issues HEVC scalability," Joint Collaborative Team on Video Coding (JCT-VC) of ITU-T SG 16 WP 3 and ISO/IEC JTC 1/SC 29/WG 11, URL:http://www.phenix.it-sudoaris.eu/lct/doc_end_user/documents/14-Vienna/wg11/JCTVC-N0049-v2.zip, (Jul. 29-Aug. 2, 2013), pp. 1-6.
International Search Report dated Sep. 16, 2014 in PCT/JP14/068643 Filed Jul. 11, 2014.
Japanese Office Action dated Apr. 28, 2015 in a corresponding application No. JP2014-7306 filed Jan. 17, 2014 (with English translation).
Office Action dated Dec. 22, 2015 in Japanese Patent Application No. 2015-231867.
Office Action dated Dec. 22, 2015 in Japanese Patent Application No. 2015-231896.
Rickard Sjoberg, et al., "High-Level Syntax for Bitstream Extraction" Joint Collaborative Team on Video Coding (JCT-VC) of ITU-T SG16 WP3 and ISO/IEC JTC1/SC29/WG11, Nov. 21-30, 2011, 15 Pages.
Office Action dated Feb. 23, 2016 in Japanese Patent Application No. 2015-231896.
Office Action dated Feb. 23, 2016 in Japanese Patent Application No. 2015-231867.
Information technology—Generic coding of moving pictures and associated audio information: Systems Amendment 3: Transport of HEVC video over MPEG-2 systems [SC 29/WG 11 N 12637], ISO/IEC JTC 1/SC 29 N 12806, May 24, 2012, 3 Pages.
Office Action dated May 24, 2016 in Japanese Patent Application No. 2015-231867 (with Partial English translation).
Office Action dated May 24, 2016 in Japanese Patent Application No. 2015-231896 (with Partial English translation).
Extended European Search Report, dated in Patent Application No. 14835176.0 dated Apr. 11, 2017 (10 pgs).
Fraunhofer HHI, Proposal, Karsten Gruneberg, et al., "On Transport of HEVC over MPEG-2 Systems", ISO/IEC JTC1/SC29/WG11, Apr. 2012, Geneva, Switzerland (6 pgs).
Sony Electronics, Inc. and Sony Corp., Input Contribution, Munsi Haque, et al. "On HEVC Descriptors for Temporal Substreams with Multiple PIDs in a MPEG-2 Transport Stream", ISO/IEC JTC1/SC29/WG11, Jul. 2012, Stockholm, Sweden. (6 pgs).
Sony Electronics, Inc. and Sony Corp., Input Contribution, Munsi Haque, et al. "On HEVC Descriptors for Temporal substreams with a single PID in a MPEG-2 Transport Stream" ISO/IEC JTC1/SC29/WG11, MPEG2012/m26186, Jul. 2012, Stockholm, Sweden. (8 pgs).

(56) References Cited

OTHER PUBLICATIONS

Fraunhofer HHI, Proposal, Karsten Gruneberg, et al., "Transport of HEVC over MPEG-2 Systems", ISO/IEC JTC1/SC29/WG11 MPEG99/M23706, Feb. 2012, San Jose, CA, USA (8 pgs).

Japanese Office Action dated Dec. 12, 2017 in Japanese Application No. 2015-001993, 6 pages.

Thomas Rusert, et al., High level syntax for scalability support in HEVC, JCTVC-F491, ITU-T, Jul. 16, 2011, pp. 1-9.

Transport of High Efficiency Video Coding (HEVC) Streams over ITU-T Rec H.222.0, ISO/IEC 13818-1:201X/PDAM 3(E) Rec. ITU-TH.222.0/Amd. 3, ISO/IEC JTC1/SC29, May 24,2012, pp. 1-9.

Chinese Office Action dated Aug. 3, 2018 in Chinese Patent Application No. 2014800346493. 17 pages.

Japanese Office Action dated Feb. 19, 2019 in Japanese Application No. 2018-084684, 4 pages.

Ye-Kui Wang, *HRD parameter in VPS*, Joint Collaborative Team on Video Coding (JCT-VC) of ITU-T SG 16 WP 3 and ISO/IEC JTC I/SC 29/WG 11, $10^{th}$ Meeting: Stockholm, SE, Jul. 11-20, 2012, Document JCTVC-J0562, 12 pages.

ITU-T, Advanced video coding for generic audiovisual services, Series H: Audiovisual and Multimedia Systems, Telecommunication Standardization Sector of ITU, H.264 (Apr. 2013), 7 pages.

Japanese Office Action dated Jun. 4, 2019 in Japanese Patent Application No. 2018-084664, 4 pages.

\* cited by examiner

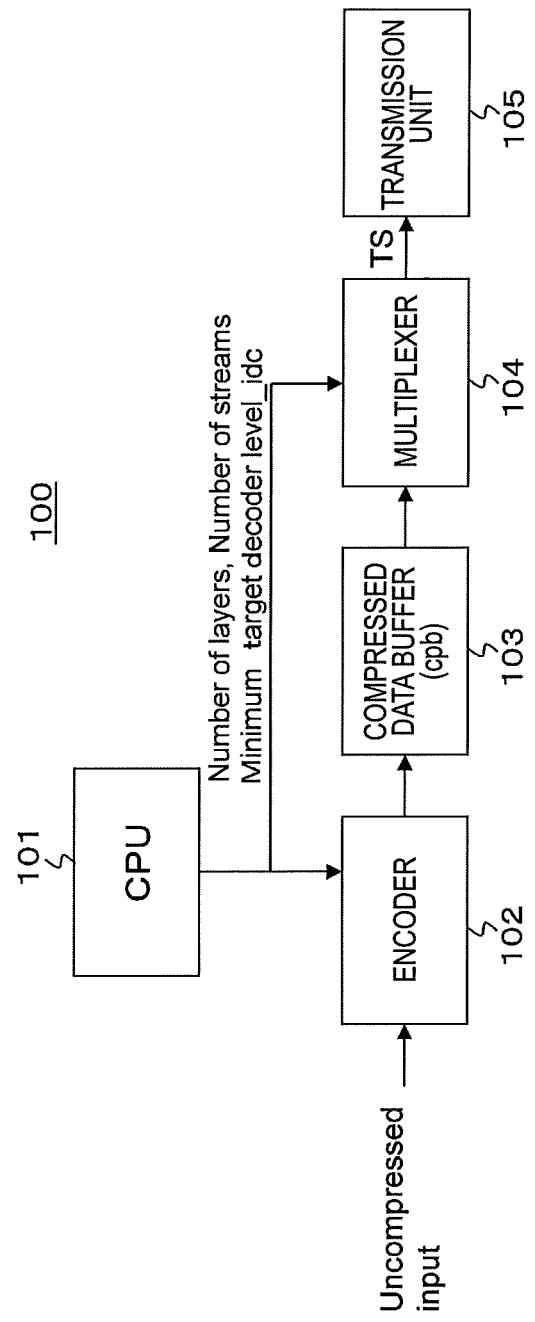

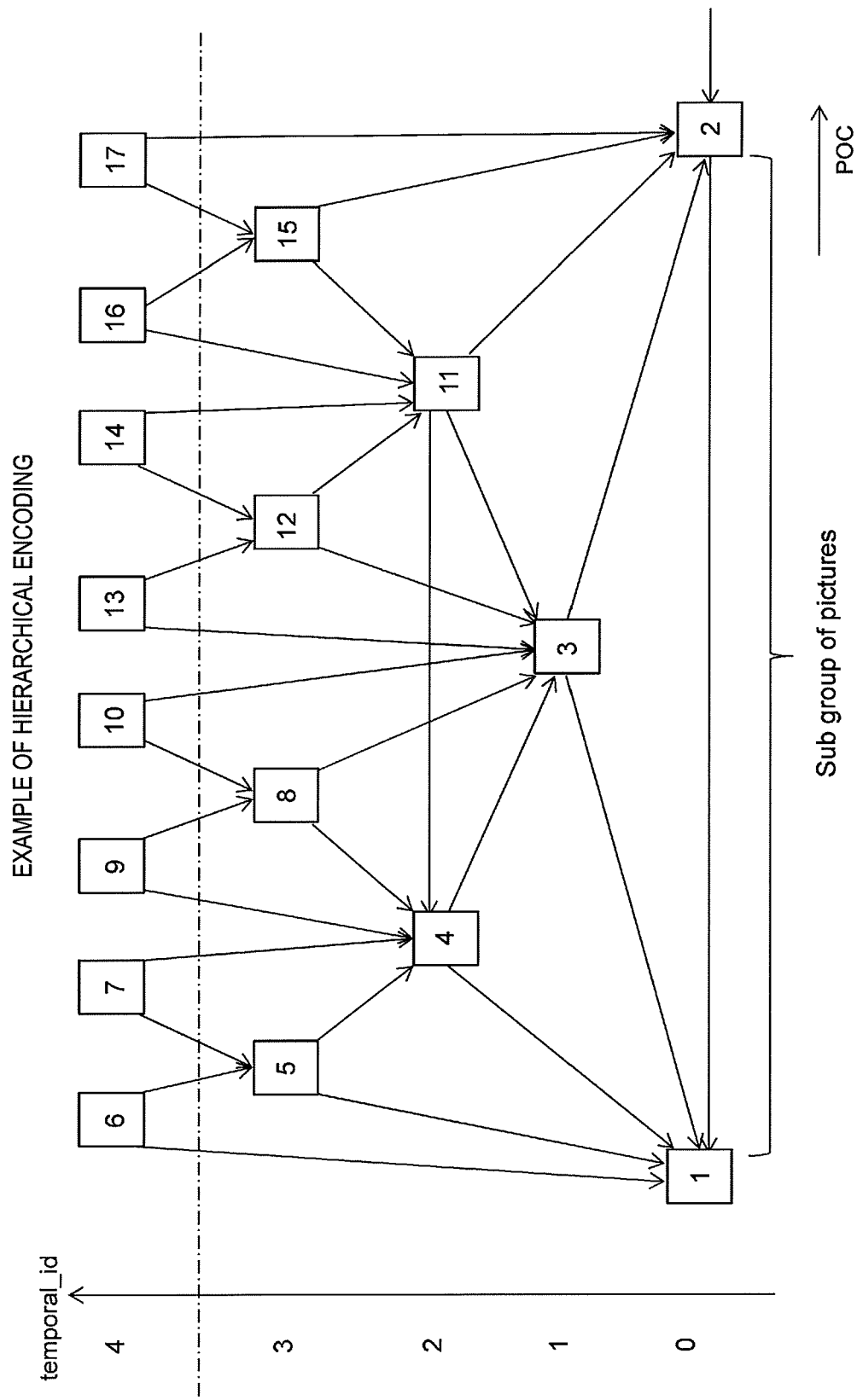

FIG.4

(a)
```
nal_unit_header( ) {                          Descriptor
        forbidden_zero_bit                    f(1)
        nal_unit_type                         u(6)
        nuh_layer_id                          u(6)
        nuh_temporal_id_plus1                 u(3)
}
```

(b)
Semantics

Forbidden_zero_bit          (1bit)
    0 IS NECESSARY
Nal_unit_type          (6bits)
    VALUE IS DECIDED FOR EACH NAL UNIT BELOW.

| AUD | VPS | SPS | PPS | PSEI | SLICE | SSEI | EOS |

Nuh_layer_id          (6bits)
    0 IS ASSUMED
Nuh_temporal_id_plus1  (3bits)
    INDICATE temporal_id. VALUE (1 to 7) OBTAINED BY ADDING 1 IS SET.
    VALUE OF temporal_id IS 0 TO 6.

FIG.5

GOP LEADING PICTURE: | AUD | VPS | SPS | PPS | PSEI | SLICE | SSEI | EOS |

OTHER THAN GOP LEADING PICTURE: | AUD | PPS | PSEI | SLICE | SSEI | EOS |

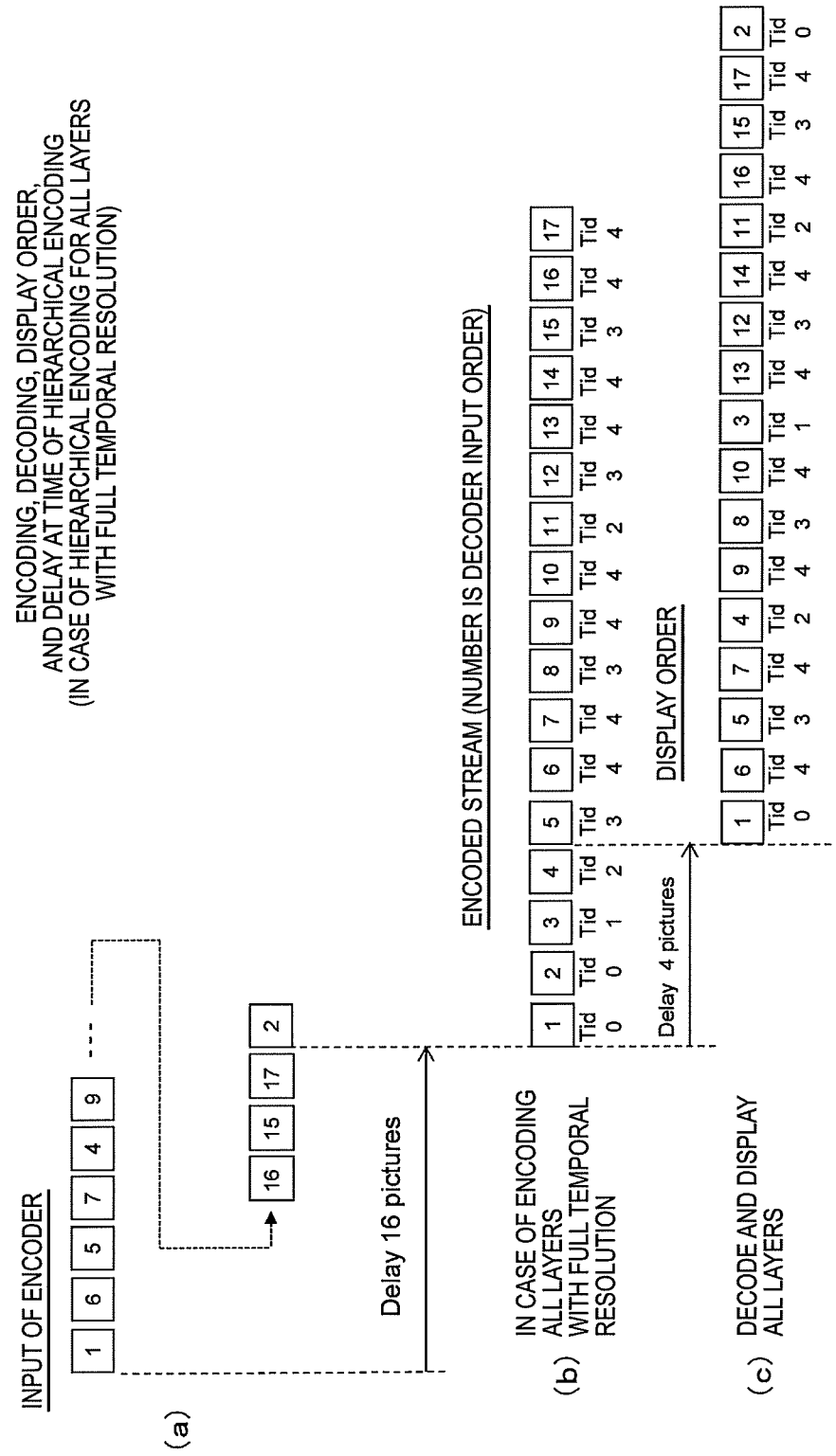

FIG.14

| | | |
|---|---|---|
| HEVC_descriptor() { | | |
|     descriptor_tag | 8 | uimsbf |
|     descriptor_length | 8 | uimsbf |
|     profile_space | 2 | uimsbf |
|     tier_flag | 1 | bslbf |
|     profile_idc | 5 | uimsbf |
|     reserved_zero_16bits | 16 | bslbf |
|     level_idc | 8 | uimsbf |
|     profile_compatibility_indication | 32 | bslbf |
|     temporal_layer_subset_flag | 1 | bslbf |
|     HEVC_still_present_flag | 1 | bslbf |
|     HEVC_24hr_picture_present_flag | 1 | bslbf |
|     frame_packing_arrangement_SEI_present_flag | 1 | bslbf |
|     level_constrained_flag | 1 | bslbf |
|     scalability_id | 3 | bslbf |
|     if ( temporal_layer_subset_flag == '1') { | 3 | uimsbf |
|         temporal_id_min | 5 | bslbf |
|         reserved | 3 | uimsbf |
|         temporal_id_max | 5 | bslbf |
|         reserved | | |
|     } | | |
| } | | |

FIG.15

| Semantics | | |
|---|---|---|
| level_constrained_flag (1bit) | | THERE IS SPS OR ESPS IN CORRESPONDING SUBSTREAM, AND general_level_idc THAT IS ELEMENT THEREOF INDICATES VALUE OF LEVEL WHICH INCLUDES PICTURE EQUAL TO OR LOWER THAN temporal_id INCLUDED IN CORRESPONDING SUBSTREAM. |
| | 1 | THERE IS SPS OR ESPS IN CORRESPONDING SUBSTREAM, AND general_level_idc THAT IS ELEMENT THEREOF HAS VALUE OF LEVEL WHICH INCLUDES Picture EQUAL TO OR LOWER THAN temporal_id INCLUDED IN CORRESPONDING SUBSTREAM. |
| | 0 | THERE IS ONE SPS IN GROUP OF SUBSTREAMS CONSTITUTING TARGET SERVICE, AND general_level_idc THEREOF INDICATES VALUE OF LEVEL WHICH INCLUDES NOT ONLY CORRESPONDING SUBSTREAM BUT ALSO OTHER SUBSTREAM UNDER SAME SERVICE. |
| scalability_id (3 bits) | | ID WHICH INDICATES SCALABILITY GIVEN TO PLURALITY OF INDIVIDUAL VIDEO STREAMS WHEN STREAMS SUPPLY ONE SCALABLE SERVICE |
| | 0 | Base stream |
| | 1~7 | id WHICH INCREASES ACCORDING TO DEGREE OF SCALABILITY FROM BASE STREAM |

FIG.16 scalability_extension_descriptor syntax

| Syntax | No. of Bits | Format |
|---|---|---|
| scalability_extension_descriptor() { | | |
| scalability_extension_descriptor_tag | 8 | uimsbf |
| scalability_extension_descriptor_length | 8 | uimsbf |
| extension_stream_existing_flag | 1 | bslbf |
| extension_type | 3 | bslbf |
| number_of_streams | 4 | bslbf |
| scalability_id | 3 | bslbf |
| minimum_target_decoder_level_idc | 8 | bslbf |
| reserved | 5 | 0x1f |
| } | | |

FIG.17 scalability_extension_descriptor semantics

| | |
|---|---|
| extension_stream_existing_flag (1 bit) | FLAG WHICH INDICATES THAT THERE IS EXTENDED SERVICE BASED ON SEPARATE STREAM |
| 1 | THERE IS EXTENDED STREAM |
| 0 | THERE IS NO EXTENDED STREAM |
| extension_type (3 bits) | INDICATE TYPE OF EXTENSION |
| 001 | EXTENSION IS TIME-DIRECTION SCALABLE |
| 010 | EXTENSION IS SPATIAL-DIRECTION SCALABLE |
| 011 | EXTENSION IS BIT-RATE SCALABLE |
| ohters | reserved |
| number_of_streams (4 bits) | TOTAL NUMBER OF STREAMS INVOLVED IN DISTRIBUTION SERVICE |
| 0000 | reserved |
| 0001 | 1 stream |
| : | : |
| 1111 | 15 streams |
| scalability_id (3 bits) | ID WHICH INDICATES SCALABILITY GIVEN TO PLURALITY OF INDIVIDUAL VIDEO STREAMS WHEN STREAMS SUPPLY ONE SCALABLE SERVICE |
| 0 | Base stream |
| 1~7 | ID WHICH INCREASES ACCORDING TO DEGREE OF SCALABILITY FROM BASE STREAM |
| minimum_target_decoder_level_idc (8bits) | COINCIDES WITH DEFINITION OF general_level_idc INDICATING VALUE OF level OF MINIMUM DECODING CAPABILITY THAT CORRESPONDING STREAM TARGETS. |

FIG.18

```
Syntax
transport_packet(){
                sync_byte
        transport_error_indicator
        payload_unit_start_indicator
        transport_priority
        PID
        transport_scrambling_control
        adaptation_field_control
        continuity_counter
        if(adaptation_field_control=='10'||
adaptation_field_control=='11'){
                adaptation_field()
        }
        if(adaptation_field_control=='01' ||
adaptation_field_control=='11') {
                for (i=0;i<N;i++){
                        data_byte
                }
        }
}
```

DEVICE AND ASSOCIATED METHOD FOR USING LAYER DESCRIPTION AND DECODING SYNTAX IN MULTI-LAYER VIDEO

CROSS-REFERENCE TO RELATED APPLICATION

This application is a continuation of U.S. patent application Ser. No. 14/898,283, filed Dec. 14, 2015, now pending, which is a National Stage application of PCT/JP14/068643, filed Jul. 11, 2014, which is based upon and claims the benefit of priority from Japanese Patent Application Nos. 2013-167168, filed Aug. 9, 2013, and 2014-007306, filed Jan. 17, 2014, the entire contents of all which are incorporated herein by reference.

BACKGROUND OF THE INVENTION

Field of the Invention

The present technology relates to a transmission device, a transmission method, a reception device, a reception method, an encoding device, and an encoding method. Particularly, the present technology relates to a transmission device which performs hierarchical encoding image data of each picture which constitutes dynamic image data and transmits the data.

Description of the Related Art

When the service of a compressed dynamic image is provided through broadcast, a network, or the like, the upper limit of a reproducible frame frequency is defined according to the decoding capability of a receiver. Thus, it is necessary for a service-providing side to restrict only provision of a service of low frame frequencies, or to simultaneously provide a service of a plurality of high and low frame frequencies, taking the reproduction capability of a distributed receiver into consideration.

Receivers which are compatible with the service of high frame frequencies incur a high cost, which is a factor hindering their distribution. Since only inexpensive receivers dedicated to services of low frame frequencies were distributed initially, if service providers start services of high frame frequencies in the future, viewing the services will not be possible without a new receiver, which is another factor hindering distribution of the services.

For example, in High Efficiency Video Coding (HEVC), time direction scalability in which image data of respective pictures which constitute dynamic image data undergoes hierarchical encoding has been proposed (refer to Non-Patent Literature 1). A reception side can identify the layer of each picture based on a temporal ID (temporal_id) that has been inserted into the header of a Network Abstraction Layer (NAL) unit, and can perform selective decoding up to layers commensurate with a decoding capability.

CITATION LIST

Non-Patent Literature

Non-Patent Literature 1: "Overview of the High Efficiency Video Coding (HEVC) Standard" written by Gary J. Sullivan, Jens-Rainer Ohm, Woo-Jin Han, and Thomas Wiegand, IEEE TRANSACTIONS ON CIRCUITS AND SYSTEMS FOR VIDEO TECNOROGY, VOL. 22, NO. 12, pp. 1649-1668, December 2012.

SUMMARY OF THE INVENTION

Technical Problem

An objective of the present technology is to enable a reception side to perform a favorable decoding process commensurate with its decoding capability.

Solution to Problem

A concept of the present technology is a transmission device including: an image encoding unit configured to classify image data of each of pictures which constitute dynamic image data into a plurality of layers, to encode image data of each of the classified layers, and to generate a video stream having the encoded image data of the pictures of each of the layers; and a transmission unit configured to transmit a container in a predetermined format which includes the generated video stream. The image encoding unit adds decoding timing information, which has been set in a manner that a higher layer has a shorter decoding time interval of the encoded image data of each of the pictures, to the encoded image data of the pictures of each of the layers.

In the present technology, the image encoding unit generates a video stream (encoded stream) by encoding image data of each of pictures constituting dynamic image data. In this case, the image data of each of the pictures constituting the dynamic image data is classified into a plurality of layers and encoded, and a video stream having the image data of the pictures of each of the layers is generated. In this case, decoding timing information set such that a higher layer has a shorter decoding time interval of encoded image data of each picture, for example, a decoding time stamp, is added to the encoded image data of the picture of each of the layers.

The transmission unit transmits a container in a predetermined format which includes the above-described video stream. The container may be, for example, a transport stream (MPEG-2 TS) that has been employed in digital broadcasting standards. In addition, the container may be, for example, MP4 that has been used in distribution on the Internet and the like, or a container in a format other than that.

For example, the image encoding unit may generate a single video stream having the encoded image data of the pictures of each of the layers, and divide the plurality of layers into a predetermined number of layer sets, the number being equal to or greater than two, and add identification information for identifying an affiliated layer set to encoded image data of pictures of each of the layer sets. In this case, the identification information is, for example, a level designation value of a bitstream, and a higher value thereof may be set for a layer set on a higher layer side.

In addition, the image encoding unit may, for example, divide the plurality of layers into the predetermined number of layer sets, the number being equal to or greater than two, and generate a predetermined number of video streams each having encoded image data of pictures of the layer sets. In this case, the image encoding unit may, for example, add identification information for identifying an affiliated layer set to the encoded image data of the picture of each of the layer sets. In addition, the identification information in this case may be, for example, a level designation value of a bitstream, and a higher value thereof is set for a layer set on a higher layer side.

As described above, in the present technology, decoding timing information set such that a higher layer has a shorter decoding time interval of encoded image data of each picture is added to the encoded image data of the pictures of each of the layers. For this reason, a reception side can perform a favorable decoding process according to decoding performance. Even when a decoding capability is low, for example, encoded image data of pictures of a low layer can be selectively decoded without causing a buffer failure.

In the present technology, for example, the image encoding unit may generate a single video stream having the encoded image data of the pictures of each of the layers or divide the plurality of layers into a predetermined number of layer sets, the number being equal to or greater than two, and generate the predetermined number of video streams having encoded image data of pictures of each of the layer sets, and further include an information insertion unit configured to insert configuration information of a video stream included in the container into a layer of the container. In this case, for example, a reception side can easily ascertain the configuration of the video stream based on the configuration information of the video stream included in the container, and thus can perform a proper decoding process.

In the present technology, for example, the transmission unit may divide the plurality of layers into a predetermined number of layer sets, the number being equal to or greater than two, and set a higher priority of a packet which contains encoded image data of pictures of a layer set on a lower layer side. In this case, for example, the reception side can only put encoded image data of pictures of a layer set commensurate with its own decoding capability into a buffer based on the priority of the packet.

Another concept of the present technology is a reception device including: a reception unit configured to receive a container in a predetermined format which includes a video stream having encoded image data of pictures of each of layers which is obtained by classifying image data of each of the pictures which constitute dynamic image data into a plurality of layers and encoding the image data. Decoding timing information that is set in a manner that a higher layer has a shorter decoding time interval of the encoded image data of each of the pictures is added to the encoded image data of the pictures of each of the layers. The reception device further includes a processing unit configured to obtain, by decoding encoded image data of pictures of a layer equal to or lower than a predetermined layer selected from the video stream included in the received container at a decoding timing indicated by the decoding timing information, image data of the pictures of the layer equal to or lower than the predetermined layer.

In the present technology, the reception unit receives the container in the predetermined format. This container includes the video stream having the image data of the pictures of each of the layers obtained by classifying the image data of each of the pictures which constitute the dynamic image data into the plurality of layers and encoding the data. The decoding timing information set such that a higher layer has a shorter decoding time interval of encoded image data of each picture, for example, a decoding time stamp, is added to the encoded image data of the pictures of each of the layers.

The processing unit obtains the image data of each of the pictures by decoding the encoded image data of the pictures of the layer equal to or lower than the predetermined layer selected from the video stream included in the received container. In this case, the decoding of the encoded image data of each picture is performed at the decoding timing indicated by the decoding timing information added thereto at the latest.

For example, the received container may include a single video stream having the encoded image data of the pictures of each of the layers. The plurality of layers may be divided into a predetermined number of layer sets, the number being equal to or greater than two, and a higher priority of a packet which contains encoded image data of pictures of a layer set on a lower layer side may be set. The processing unit may put encoded image data of pictures of a predetermined layer set contained in a packet with a priority selected according to a decoding capability in a buffer to decode the encoded image data.

For example, the received container may include a predetermined number of video streams, the number being equal to or greater than two, having image data of pictures of the predetermined number of layer sets obtained by dividing the plurality of layers. The processing unit may put encoded image data of pictures of a predetermined layer set included in a video stream selected according to a decoding capability in a buffer to decode the encoded image data.

In the present technology as described above, the decoding time stamp set such that a higher layer has a shorter decoding time interval of encoded image data of each picture is added to the encoded image data of the pictures of each of the layers, and the encoded image data of the pictures of the layer equal to or lower than the selected predetermined layer is performed at the decoding timing indicated by the decoding timing information added thereto. For this reason, it is possible to perform a favorable decoding process according to decoding performance. Even when a decoding capability is low, for example, encoded image data of pictures of a low layer can be selectively decoded without causing a buffer failure.

It should be noted that, in the present technology, for example, a post-processing unit which causes a frame rate of image data of each of pictures obtained by the processing unit to match a display capability may be further included. In this case, even when a decoding capability is low, image data of a frame rate commensurate with a high display capability can be obtained.

Another concept of the present technology is an encoding device including: an image encoding unit configured to classify image data of each of pictures constituting dynamic image data into a plurality of layers, encode image data of pictures of each of the classified layers, and generate a video stream having the encoded image data of the pictures of each of the layers. The image encoding unit divides the plurality of layers into a predetermined number of layer sets, the number being equal to or greater than two, and inserts a level designation value of a bitstream into substreams corresponding to each of the layer sets. The level designation value of the bitstream inserted into the substreams corresponding to each of the layer sets is set to be a value of a level which includes pictures of all layers included in a layer set equal to or lower than a corresponding layer set.

In the present technology, by an image encoding unit, image data of each of pictures constituting dynamic image data is classified into a plurality of layers, image data of pictures of each of the classified layers is encoded, and a video stream having the encoded image data of the pictures of each of the layers is generated.

In this case, the plurality of layers are divided into a predetermined number of layer sets, the number being equal to or greater than two, and a level designation value of a bitstream is inserted into the substreams corresponding to each of the layer sets. In addition, in this case, the level designation value of the bitstream inserted into the substreams corresponding to each of the layer sets is set to the value of the level which includes the pictures of all layers included in the layer set equal to or lower than the corresponding layer set.

The image encoding unit may, for example, generate a predetermined number of video streams which include substreams corresponding to each of the layer sets. In addition, the image encoding unit may, for example, generate a single video stream which includes all of the substreams corresponding to each of the layer sets.

In the present technology as described above, the level designation value of the bitstream is inserted into the substreams corresponding to each of the layer sets, and the value is set to the value of the level which includes the pictures of all layers included in the layer set equal to or lower than the corresponding layer set. For this reason, a reception side of the video stream can easily determine whether or not decoding of each substream is possible based on the inserted level designation value of the bitstream.

Another concept of the present technology is a transmission device including: an image encoding unit configured to classify image data of each of pictures constituting dynamic image data into a plurality of layers, encode image data of pictures of each of the classified layers, and generate a video stream having the encoded image data of the pictures of each of the layers. The image encoding unit divides the plurality of layers into a predetermined number of layer sets, the number being equal to or greater than two, and inserts a level designation value of a bitstream into substreams corresponding to each of the layer sets. The level designation value of the bitstream inserted into the substreams corresponding to each of the layer sets is set to be a value of a level which includes pictures of all layers included in a layer set equal to or lower than the layer set. The transmission device further includes a transmission unit configured to transmit a container in a predetermined format which includes the generated video stream, and an information insertion unit configured to insert, into a layer of the container, flag information which indicates that the level designation value of the bitstream inserted into the substreams of each of the layer sets is the value of the level which includes the pictures of all layers included in the layer set equal to or lower than the layer set.

In the present technology, by an image encoding unit, image data of each of pictures constituting dynamic image data is classified into a plurality of layers, image data of pictures of each of the classified layers is encoded, and a video stream having the encoded image data of the pictures of each of the layers is generated.

In this case, the plurality of layers are divided into a predetermined number of layer sets, the number being equal to or greater than two, and a level designation value of a bitstream is inserted into the substreams corresponding to each of the layer sets. In addition, in this case, the level designation value of the bitstream inserted into the substreams corresponding to each of the layer sets is set to the value of the level which includes the pictures of all layers included in the layer set equal to or lower than the layer set.

The transmission unit transmits the container in the predetermined format which includes the generated video stream. The information insertion unit inserts, into the layer of the container, flag information which indicates that the level designation value of the bitstream inserted into the substreams of each of the layer sets is the value of the level which includes the pictures of all layers included in the layer set equal to or lower than the layer set.

In the present technology as described above, a reception side can know that the level designation value of the bitstream inserted into the substreams of each of the layer sets is the value of the level which includes the pictures of all layers included in the layer set equal to or lower than the layer set with the flag information inserted into the layer of the container. For this reason, the reception side can achieve efficiency of a decoding process without a process of checking the value of the level which includes the pictures of all layers included in each of the substreams equal to or lower than a predetermined layer set using the level designation value of each layer or the like.

Advantageous Effects of Invention

According to the present technology, a favorable decoding process is possible according to a decoding capability. It should be noted that the effects described herein are not necessarily limitative, and any effect described in the present disclosure may be exhibited.

BRIEF DESCRIPTION OF THE DRAWINGS

FIG. 2 is a block diagram showing a configuration example of a transmission device.

FIG. 3 is a diagram showing an example of hierarchical encoding performed by an encoder.

FIG. 4 is a diagram showing a structure example (syntax) of an NAL unit header and the content (semantics) of principal parameters in the structure example.

FIG. 5 is a diagram for describing a configuration of encoded image data of each picture based on HEVC.

FIG. 6 is a diagram showing an example of encoding, decoding, a display order, and a delay at the time of hierarchical encoding.

FIG. 14 is a diagram showing a structure example (syntax) of an HEVC descriptor (HEVC_descriptor).

FIG. 15 is a diagram showing the content of principal information (semantics) of the structure example of the HEVC descriptor.

FIG. 16 is a diagram showing a structure example (syntax) of a scalability extension descriptor (scalability_extension_descriptor).

FIG. 17 is a diagram showing the content of principal information (semantics) in the structure example of the scalability extension descriptor.

FIG. 18 is a diagram showing a structure example (syntax) of a TS packet.

DETAILED DESCRIPTION OF THE PREFERRED EMBODIMENTS

Hereinafter, embodiments for implementing this technology (hereinafter referred to as "embodiments") will be described. Note that description will be provided in the following order.

1. Embodiment

2. Modified Example

1. Embodiment

Transmission and Reception System

Figure 1:
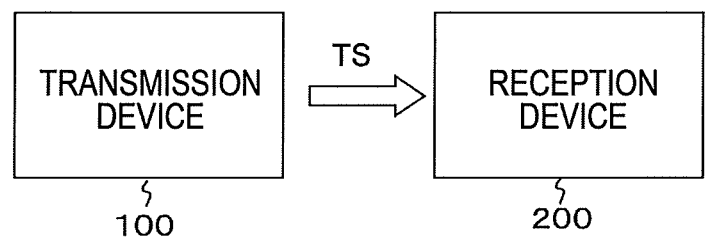
FIG. 1 is a block diagram showing a configuration example of a transmission and reception system of an embodiment.

FIG. 1 shows a configuration example of a transmission and reception system 10 as an embodiment. This transmission and reception system 10 is configured to have a transmission device 100 and a reception device 200.

The transmission device 100 transmits a transport stream TS that is a container by causing the stream to be carried on broadcast waves. The transport stream TS includes a video stream having encoded data of image data of pictures of each layer which is obtained by dividing image data of each of pictures which constitute dynamic image data into a plurality of layers. In this case, for example, encoding in H.264/AVC, H.265/HEVC, or the like is performed, and a reference source picture is encoded to be affiliated to its own layer and/or a layer lower than its own layer.

Layer identification information for identifying an affiliated layer of each picture is added to encoded image data of pictures of each layer. Layer identification information ("nuh_temporal_id_plus1" which means temporal_id) is disposed in the header part of an NAL unit (nal_unit) of each picture. By adding the layer identification information in this manner, a reception side can selectively take out encoded image data of a layer equal to or lower than a predetermined layer and perform a decoding process thereon.

A transport stream TS includes a single video stream having encoded image data of pictures of each layer or a predetermined number of video streams having encoded image data of pictures of each layer set which is obtained by dividing a plurality of layers into a predetermined number of layer sets, the number being equal to or greater than two. In addition, layer information of hierarchical encoding and configuration information of a video stream are inserted into the transport stream TS. The information is inserted into a transport layer. With the information, the reception side can easily ascertain a layer configuration or a stream configuration, and thus can perform a proper decoding process.

In addition, the plurality of layers are divided into the predetermined number of layer sets as described above, and the priority of a TS packet (transport stream packet) which contains encoded image data of pictures of a layer set on a low layer side is set to be high. According to this priority, the reception side can only put the encoded image data of pictures of a layer set commensurate with its own decoding capability into a buffer and process the data.

In addition, the plurality of layers are divided into the predetermined number of layer sets as described above, and identification information for identifying an affiliated layer set is added to encoded image data of pictures of each layer set. As this identification information, for example, a level designation value (level_idc) of a bitstream is used, and a layer set on a higher layer side has a higher value.

The reception device 200 receives the transport stream TS described above transmitted by being carried on broadcast waves from the transmission device 100. The reception device 200 selectively takes out the encoded image data of layers equal to or lower than a predetermined layer from the video stream included in the transport stream TS and decodes the data according to its decoding capability, and acquires image data of each picture to perform image reproduction.

As described above, there is a case in which, for example, a transport stream TS includes a single video stream having encoded image data of pictures of a plurality of layers. In this case, the encoded image data of each picture of a predetermined layer set contained in a TS packet with a priority selected according to a decoding capability is taken into a buffer and decoded.

In addition, as described above, there is a case in which, for example, a transport stream TS includes a predetermined number of video streams each having encoded image data of pictures of a predetermined number of layer sets, the number being equal to or greater than two, which are obtained by dividing a plurality of layers. In this case, the encoded image data of each picture of a predetermined layer set of a video stream selected according to the decoding capability is taken into a buffer and decoded.

In addition, the reception device 200 performs post-processing of causing the frame rate of image data of each picture obtained from decoding as described above to match a display capability. Through this post-processing, for example, it is possible to obtain image data of a frame rate commensurate with a high display capability even when a decoding capability is low.

Configuration of Transmission Device

FIG. 2 shows a configuration example of the transmission device 100. This transmission device 100 has a central processing unit (CPU) 101, an encoder 102, a compressed data buffer (coded picture buffer or cpb) 103, a multiplexer 104, and a transmission unit 105. The CPU 101 is a control unit, which controls operations of each unit of the transmission device 100.

The encoder 102 receives an input of uncompressed dynamic image data and performs hierarchical encoding. The encoder 102 classifies image data of respective pictures which constitute the dynamic image data into a plurality of layers. Then, the encoder 102 encodes the image data of the pictures of each of the classified layers, and generates a video stream having encoded image data of the pictures of the respective layers. The encoder 102 performs encoding in, for example, H.264/AVC, H.265/HEVC, or the like. At this time, the encoder 102 performs encoding such that a picture to be referred to (reference source picture) is affiliated to its own layer and/or a layer lower than its own layer.

FIG. 3 shows an example of hierarchical encoding performed by the encoder 102. This is an example in which layers are classified into 5 layers from 0 to 4 and encoding is performed on image data of pictures of the respective layers.

The vertical axis represents layers. 0 to 4 are respectively set as temporal_id (layer identification information) which is disposed in the header part of an NAL unit (nal_unit) which constitutes encoded image data of pictures in Layers 0 to 4. On the other hand, the horizontal axis represents display order (picture order of composition or POC), with the left side thereof representing earlier display times and the right side thereof representing later display times.

FIG. 4(a) shows a structure example (syntax) of the header of an NAL unit, and FIG. 4(b) shows the content (semantics) of principal parameters in the structure example. The one-bit field of "forbidden_zero_bit" should have 0. The six-bit field of "nal_unit_type" represents the type of NAL unit. The six-bit field of "nuh_layer_id" is assumed to have 0. The three-bit field of "nuh_temporal_id_plus1" represents temporal_id, and has the value obtained by adding one (1 to 7).

Returning to FIG. 3, each rectangular frame represents a picture, and the number therein represents the order of an encoded picture, i.e., the encoding order (the decoding order on the reception side). For example, a subgroup of pictures is constituted by 16 pictures from "2" to "17," and "2" is the leading picture of the subgroup of pictures. "1" is a picture of the previous subgroup of pictures. Several such subgroups of pictures compose a Group of Pictures (GOP).

Encoded image data of the leading picture of a GOP is composed of NAL units that are AUD, VPS, SPS, PPS, PSEI, SLICE, SSEI, and EOS as shown in FIG. 5. On the other hand, a picture other than the leading picture of the GOP is composed of NAL units that are AUD, PPS, PSEI, SLICE, SSEI, and EOS. The VPS can be transmitted along with the SPS once in a sequence (GOP), and the PPS can be transmitted for each picture.

Returning to FIG. 3, the solid-line arrows indicate reference relations of pictures for encoding. For example, the picture of "2" is a P-picture and is encoded with reference to the picture of "1." In addition, the picture of "3" is a B-picture and is encoded with reference to the pictures of "1" and "2." Likewise, other pictures are encoded with reference to nearby pictures in the display order. It should be noted that the pictures in Layer 4 are not referred to by other pictures.

The encoder 102 generates a video stream having encoded image data of pictures of each layer. For example, the encoder 102 divides the plurality of layers into a predetermined number of layer sets, the number being equal to or greater than two, and generates a predetermined number of video streams including a substream corresponding to each layer set, or generates a single video stream including all substreams corresponding to each layer set.

For example, in the example of hierarchical encoding of FIG. 3, when layers are divided into two layer sets such that Layers 0 to 3 are regarded as a layer set of low layers and Layer 4 is regarded as a layer set of a high layer, there are two substreams. In other words, there are a substream having encoded image data of the pictures of Layers 0 to 3 and a substream having encoded image data of the pictures of Layer 4. In this case, the encoder 102 generates a single video stream including two substreams or two video streams each including two sub-video streams.

Regardless of the number of generated video streams, the encoder 102 divides the plurality of layers into a predetermined number of layer sets, the number being equal to or greater than two, and adds identification information for identifying an affiliated layer set to encoded image data of the pictures of each layer set. In this case, as the identification information, for example, "general_level_idc," which is a level designation value of a bitstream included in a sequence parameter set (SPS) and an enhanced sequence parameter set (ESPS), is used.

An SPS is a known NAL unit from the past, and is included in every sequence (GOP) of a substream of a lowest layer set, i.e., a base substream. On the other hand, an ESPS is a newly defined NAL unit, and is included in every sequence (GOP) of a substream of a layer set higher than the lowest layer, i.e., an enhanced substream. A higher layer set has a higher value of "general_level_idc" included in the SPS and ESPS.

It should be noted that, since "sub_layer_level_idc" can be sent to every sublayer using an SPS and ESPS, this "sub_layer_level_idc" can be used as identification information for identifying a layer set. The foregoing can also be supplied not only in an SPS but also in a VPS.

In this case, the value of "general_level_idc" inserted into the SPS and the ESPS of the substream of each layer set is assumed to be a value of a level which includes pictures of all layers that are included in a layer set equal to or lower than the corresponding layer set. For example, in the example of hierarchical encoding of FIG. 3, the value of "general_level_idc" inserted into the SPS of the substream of the layer set for Layer 0 to Layer 3 is assumed to be the value of the level which only includes the pictures of Layer 0 to Layer 3. For example, when a frame rate thereof is set to 60 P, the value is "level 5.1." In addition, for example, in the example of hierarchical encoding of FIG. 3, the value of "general_level_idc" inserted into the ESPS of the substream of the layer set for Layer 4 is assumed to be the value of the level which includes all pictures of Layer 0 to Layer 4. For example, when a frame rate thereof is set to 120 P, the value is "level 5.2."

FIG. 6 shows an example of encoding, decoding, a display order, and a delay at the time of hierarchical encoding. This example corresponds to the example of hierarchical encoding of FIG. 3 described above. This example shows a case in which all layers undergo hierarchical encoding with full temporal resolution. FIG. 6(a) shows an encoder input. As shown in FIG. 6(b), respective pictures are encoded in an encoding order with a delay of 16 pictures, and thereby an encoded stream is obtained. Furthermore, FIG. 6(b) also shows a decoder input, and respective pictures are decoded in a decoding order. In addition, as shown in FIG. 6(c), image data of the respective decoded pictures is obtained in a display order with a delay of 4 pictures.

Figure 7:
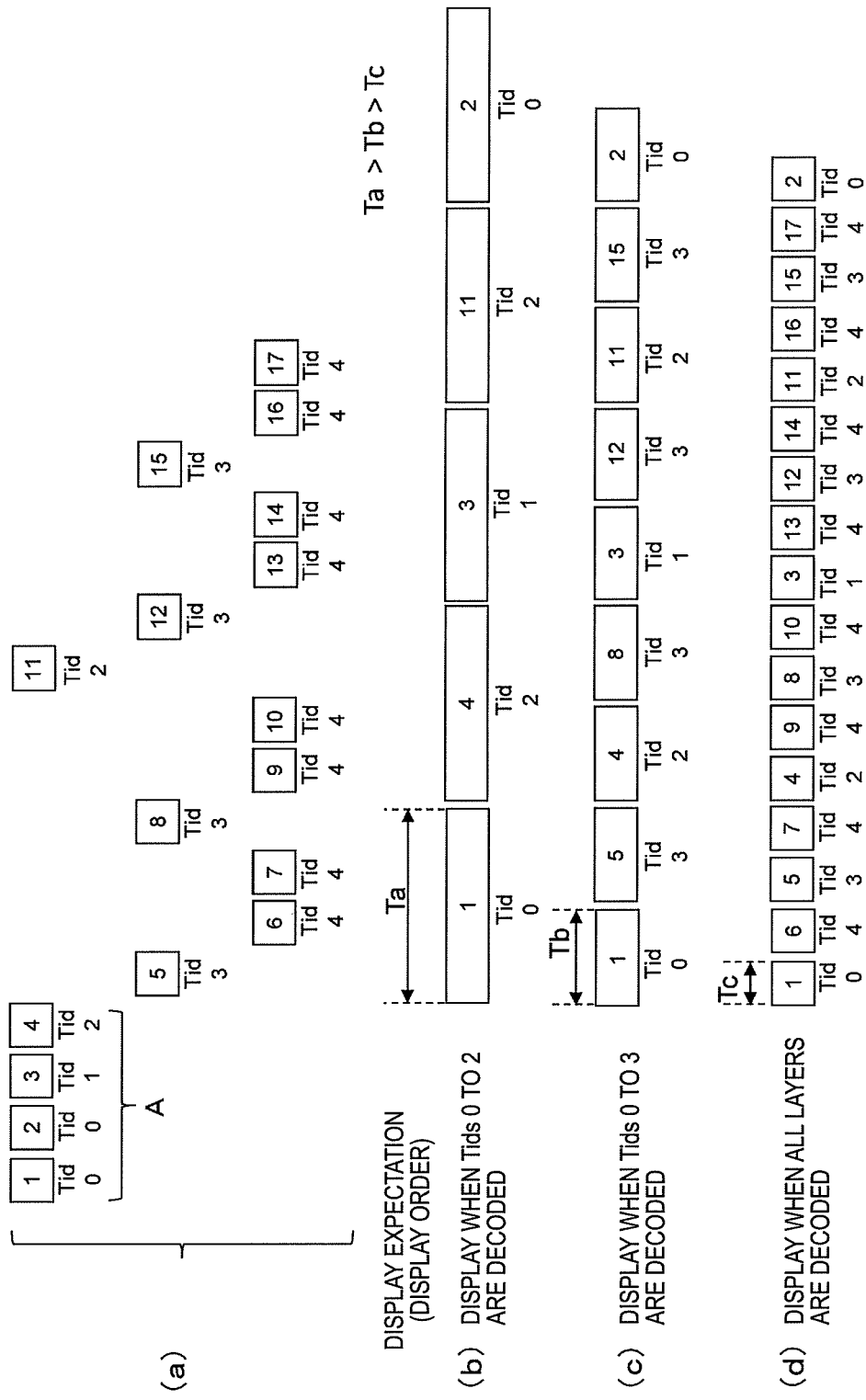
FIG. 7 is a diagram showing an encoded stream of hierarchical encoding and display expectations (display orders) in a designated hierarchy.

FIG. 7(a) shows the same encoded stream as the encoded stream shown in FIG. 6(b) described above in which the stream is divided into three stages of Layers 0 to 2, Layer 3, and Layer 4. Here, "Tid" indicates temporal_id. FIG. 7(b) shows a display expectation (display order) when the respective pictures of Layers 0 to 2, i.e., partial layers with Tid=0 to 2, are selectively decoded. In addition, FIG. 7(c) shows a display expectation (display order) when the respective pictures of Layers 0 to 3, i.e., partial layers with Tid=0 to 3, are selectively decoded. Furthermore, FIG. 7(d) shows a display expectation (display order) when the respective pictures of Layers 0 to 4, i.e., all layers with Tid=0 to 4, are selectively decoded.

When a decoding process is performed on the encoded stream of FIG. 7(a) according to a decoding capability, a decoding capability with a full rate of temporal resolution is necessary. When decoding is to be performed on layers with Tid=0 to 2, however, a decoder with ¼ of the decoding capability with respect to the encoded full temporal resolution should be able to perform the process. In addition, when decoding is performed on layers with Tid=0 to 3, a decoder with ½ of the decoding capability with respect to the full temporal resolution of encoding should be able to perform the process.

However, when pictures affiliated to a low layer which are referred to in hierarchical encoding are consecutive and they are encoded at a full timing with temporal resolution, the capability of the decoder which performs partial decoding fails to catch up. The period of A of FIG. 7(a) corresponds to the case. The decoder which is to decode some layers with Tid=0 to 2 or Tid=0 to 3 performs decoding and display with a capability of ¼ or ½ of the time axis as shown in the display example, and thus it is not possible to decode the consecutive pictures that have been encoded during the period of A with full temporal resolution. During that period, the cpb has an unexpected buffer occupancy amount of the encoder.

Ta indicates time necessary for the decoder which decodes layers with Tid=0 to 2 to perform a decoding process for each picture. Tb indicates time necessary for the decoder which decodes layers with Tid=0 to 3 to perform a decoding process for each picture. Tc indicates time necessary for the decoder which decodes layers with Tid=0 to 4 (all layers) to perform a decoding process for each picture. The relationship between the times is Ta>Tb>Tc.

Thus, buffer control is performed in this embodiment such that pictures which are affiliated to the lower layer in hierarchical encoding have a long decoding interval for respective pictures and the decoding interval becomes shorter for higher layers. At this time, a minimum decoding capability (target minimum decoder capability) with respect to the number of layers is defined. For example, in the example of hierarchical encoding of FIG. 3, if the minimum decoding capability is set to a capability of decoding up to Layer 2, an encoding interval is taken so that pictures of Layers 0 to 2 among the 5 layers can be decoded with the ¼ temporal resolution, and when they are multiplexed by a multiplexer 104 to be described below, the difference from a decoding time is reflected in a value of a decoding time stamp (DTS).

When the number of layers is 5 including 0 to 4 as shown in the example of hierarchical encoding of FIG. 3, the interval of pictures which are affiliated to Layers 0 to 2 is set to a time interval of 4 times full resolution, the interval of pictures which are affiliated to Layer 3 is set to a time interval of 2 times the full resolution, and the interval of pictures which are affiliated to Layer 4 is set to a time interval of the full resolution.

On the other hand, the encoder 102 sets timings of encoding (=decoding) of pictures not to overlap between layers. In other words, when each picture is encoded in the above-described method and encoding timings of a picture of a low layer and a picture of a high layer overlap, the encoder 102 puts priority on encoding of the picture of the low layer that is referred to by more pictures, and the encoding timing of the picture of the high layer is set accordingly. However, since a picture which is affiliated to the highest layer is a non-reference B-picture, it can be controlled to a timing at which the picture is decoded and directly displayed (in other words, not saved in a decoded picture buffer (dpb)).

Figure 8:
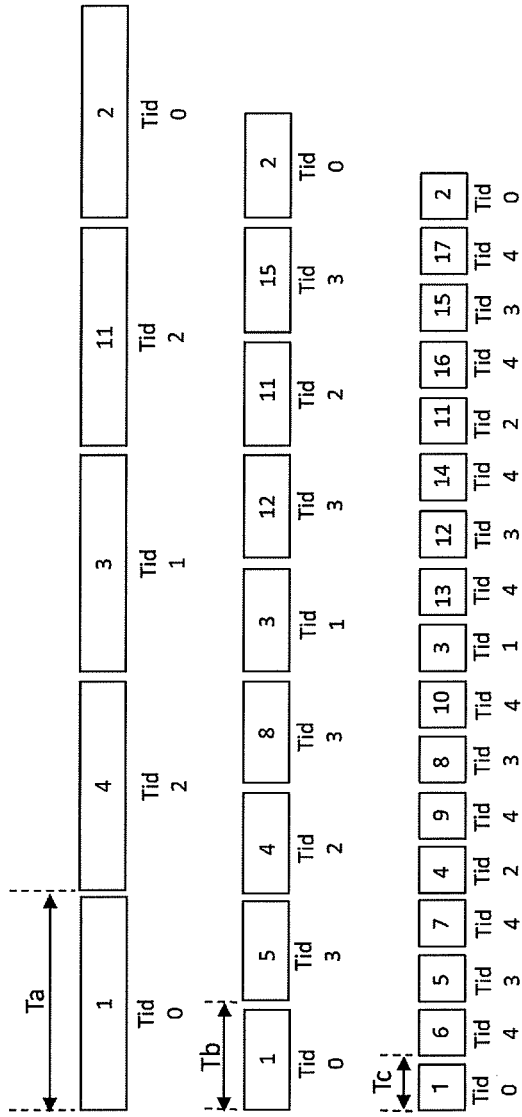
FIG. 8 is a diagram showing an encoder input order and display orders of a decoder output in a designated hierarchy.

FIG. 8(a) shows an encoder input order (the same as FIG. 6(a)). In addition, FIG. 8(b) to (d) shows display orders (which correspond to PTSs as system layers) (the same as FIG. 7(b) to (d)).

Figure 9:
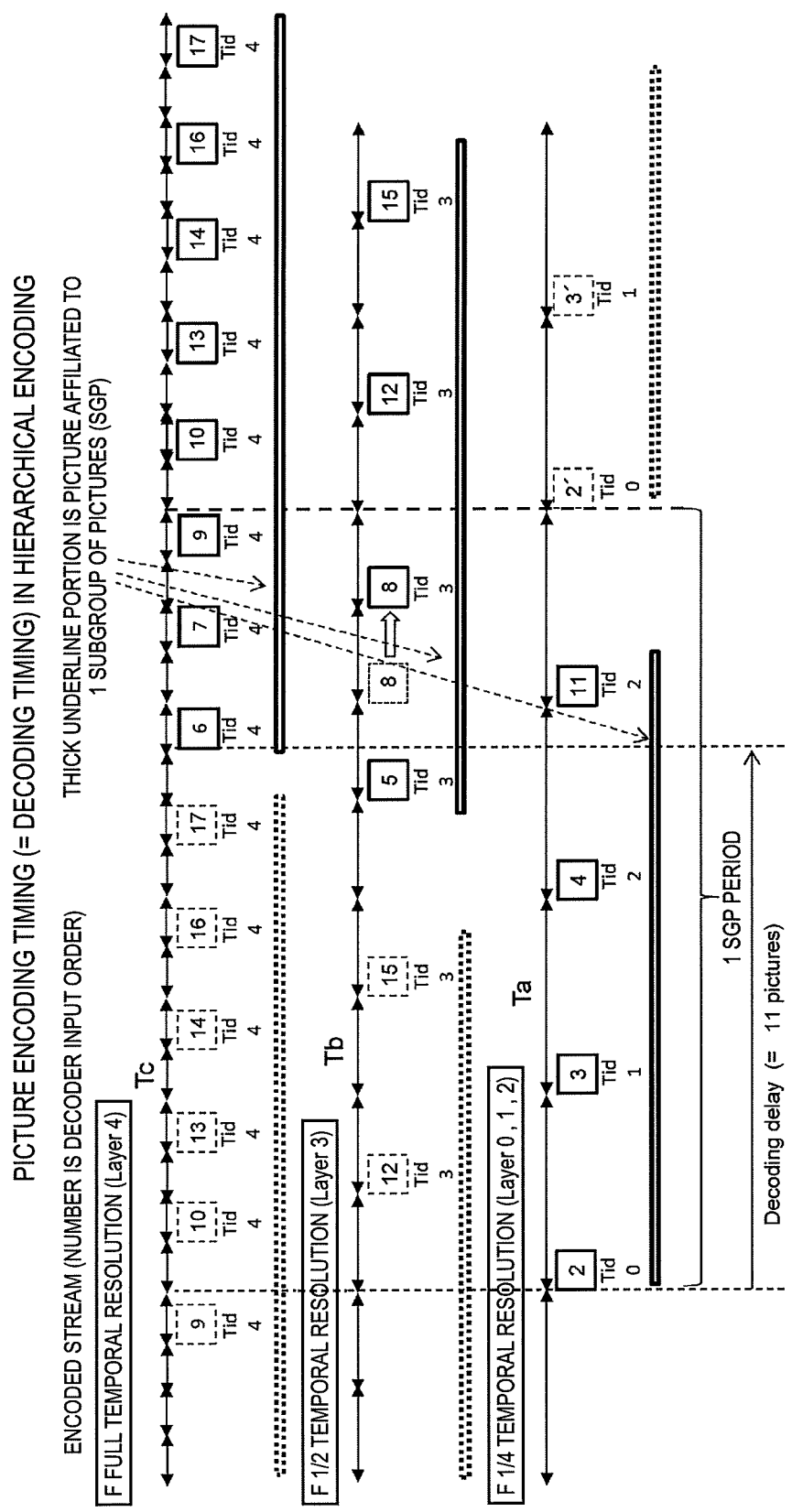
FIG. 9 is a diagram showing an example of an encoding timing of pictures at the time of hierarchical encoding (a decoding timing during decoding).

FIG. 9 shows an example of an encoding timing of pictures at the time of hierarchical encoding (a decoding timing during decoding). This example corresponds to the example of hierarchical encoding of FIG. 3 described above. In addition, this example corresponds to a minimum decoding capability in which pictures of up to Layer 2 can be decoded. The portions underlined with solid lines show pictures (16 pictures of "2" to "17") which are affiliated to one subgroup of pictures (SGP). In addition, the pictures indicated with solid-lined rectangular frames are affiliated to a current SGP, and the pictures indicated with dashed-lined rectangular frames are not affiliated to the current SGP, which does not affect prediction using the pictures which are affiliated to the current SGP.

In this case, the interval between the pictures which are affiliated to Layers 0 to 2, i.e., pictures of "2," "3," "4," "11," . . . , is set to Ta that is the time interval of 4 times the full resolution. In addition, the interval between the pictures which are affiliated to Layer 3, i.e., pictures of "5," "8," "12," . . . , is basically set to Tb that is the time interval of 2 times the full resolution.

In order to avoid overlapping of the timing of the picture of "8" with the timing of the picture of "11," however, the encoding timings are set to the next time interval positions. Likewise, the timings of the pictures of "12" and "15" are adjusted to avoid overlapping with pictures which are affiliated to Layers 0 to 2 thereafter. As a result, the timings of the pictures which are affiliated to Layer 3 are set between the timings of the pictures which are affiliated to Layers 0 to 2.

In addition, the interval of the pictures which are affiliated to Layer 4, i.e., the pictures of "6," "7," "9," . . . , is basically set to Tc that is the time interval of the full resolution. However, as a result of adjustment to avoid overlapping with the timings of the respective pictures which are affiliated to Layers 0 to 3, the timings of the pictures which are affiliated to Layer 4 are set between the timings of the pictures which are affiliated to Layers 0 to 3.

As illustrated, during the period of 1 SGP, an encoding process is performed on the pictures (16 pictures of "2" to "17") corresponding to 1 SGP. This means that real-time processing is possible even when a long encoding interval of pictures which are affiliated to a low layer is taken as described above.

Figure 10:
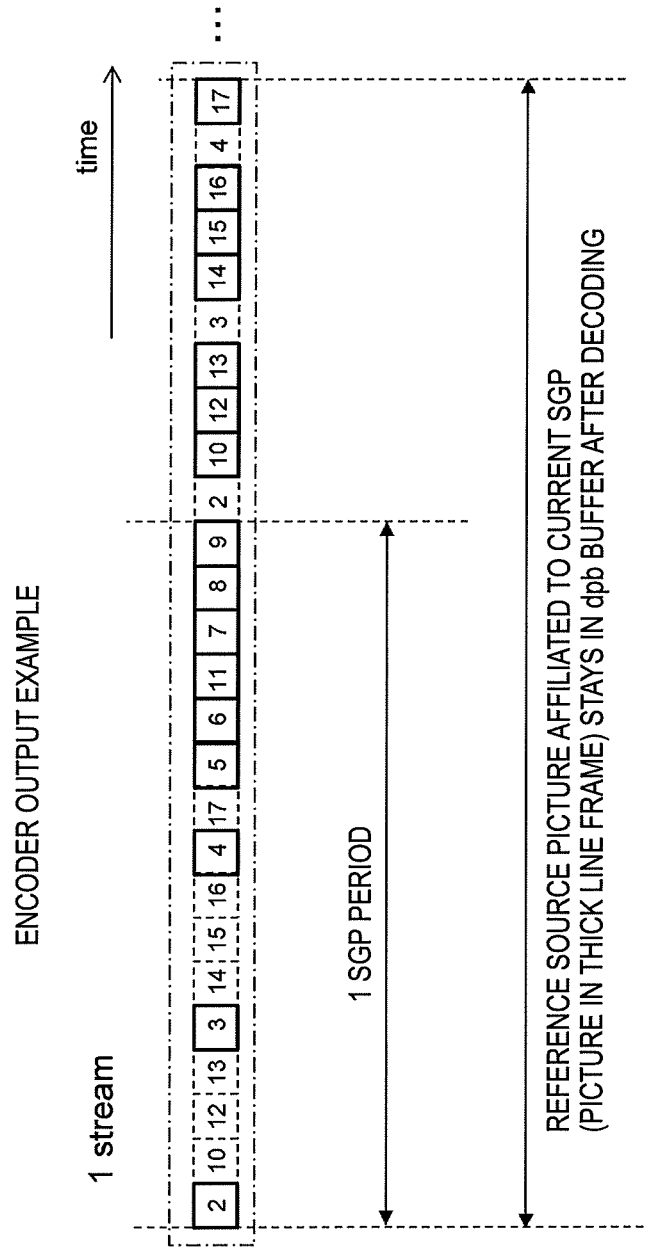
FIG. 10 is a diagram showing an output example of a single video stream (encoded stream) of the encoder.

FIG. 10 shows an output example of the encoder 102. This is an example in which the encoder 102 outputs a single video stream (encoded stream). This example corresponds to the example of hierarchical encoding of FIG. 3, in which respective pictures are encoded at the timings shown in FIG. 9.

In this video stream, encoded image data of the pictures which are affiliated to Layers 0 to 4 is arrayed in the order of encoding (encoding order). It should be noted that, when a reception side decodes this video stream, reference source pictures (the pictures of Layers 0 to 3) which are affiliated to the current SGP (the pictures in the thick-lined frames) stay in an uncompressed data buffer (decoded picture buffer or dpb) after decoding to be prepared for being referred to by other pictures.

Figure 11:
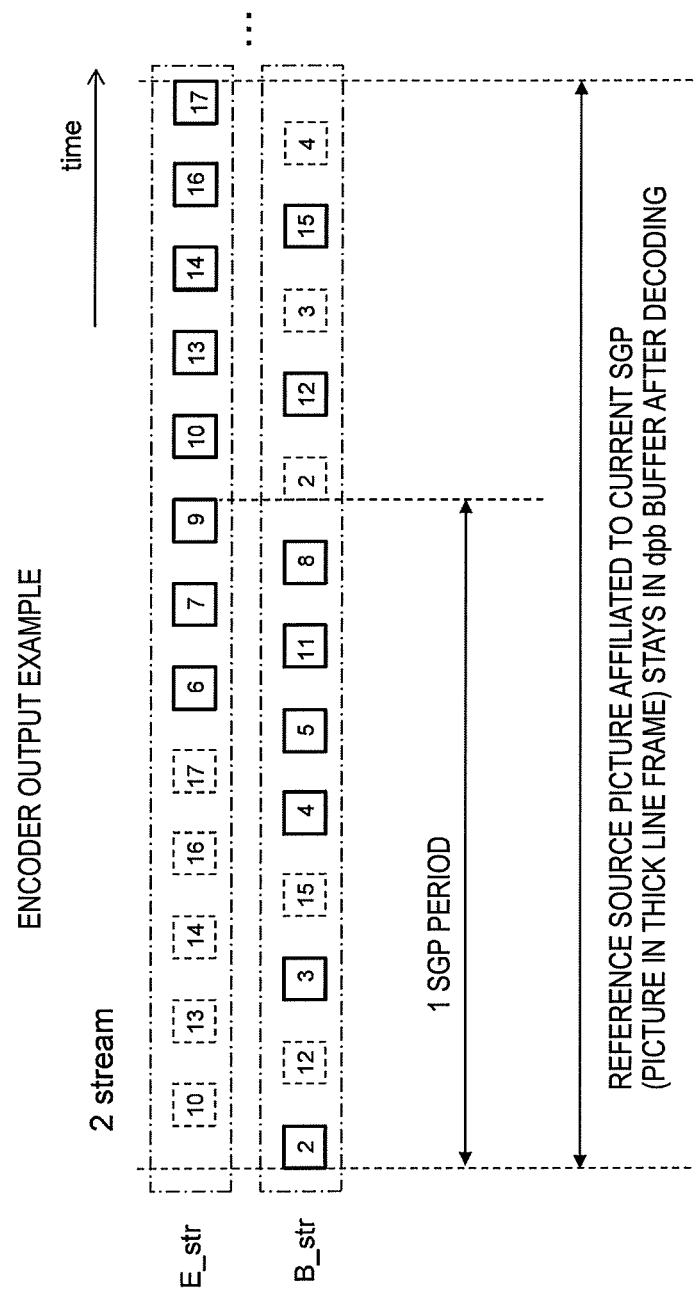
FIG. 11 is a diagram showing an output example of two video streams (encoded streams) including a base stream (B-stream) and an extended stream (E-stream) of the encoder.

FIG. 11 shows an output example of the encoder 102. This is an example in which the encoder 102 outputs two video streams (encoded streams) including a base stream (B_str) and an extended stream (E_str). This example corresponds to the example of hierarchical encoding of FIG. 3, in which respective pictures are encoded at the timings shown in FIG. 9.

The base stream (B-stream) has encoded image data of the pictures which are affiliated to Layers 0 to 3 arrayed in the order of encoding (encoding order). In addition, the extended stream (E-stream) has encoded image data of the pictures which are affiliated to Layer 4 arrayed in the order of encoding (encoding order). It should be noted that, when a reception side decodes these video streams, reference source pictures (the pictures of Layers 0 to 3) which are affiliated to the current SGP (the pictures in the thick-lined frames) stay in an uncompressed image data buffer (decoded picture buffer or dpb) after decoding to be prepared for being referred to by other pictures.

Figure 12:
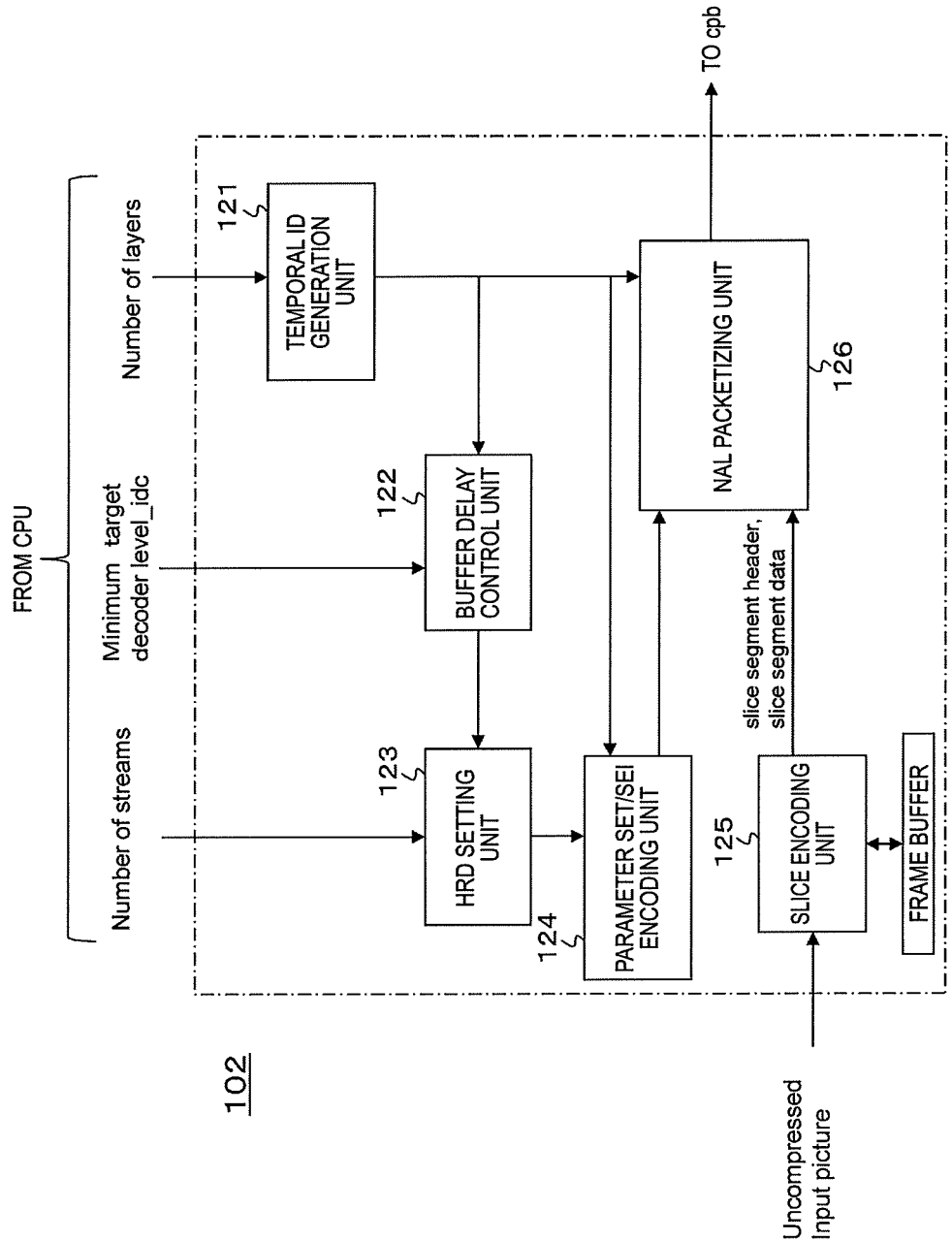
FIG. 12 is a block diagram showing a configuration example of an encoder.

FIG. 12 shows a configuration example of the encoder 102. This encoder 102 has a temporal ID generation unit 121, a buffer delay control unit 122, a hypothetical reference decoder (HRD) setting unit 123, a parameter set/SEI encoding unit 124, a slice encoding unit 125, and an NAL packetizing unit 126.

The temporal ID generation unit 121 receives supply of information on a number of layers from the CPU 101. The temporal ID generation unit 121 generates temporal_id corresponding to the number of layers based on the information on the number of layers. For example, in the example of hierarchical encoding of FIG. 3, temporal_id=0 to 4 are generated.

The buffer delay control unit 122 receives supply of information on a minimum decoding capability (minimum_target_decoder_level_idc) from the CPU 101 along with temporal_id generated by the temporal ID generation unit 121. The buffer delay control unit 122 calculates "cpb_removal_delay" and "dpb_output_delay" of each picture for each layer.

In this case, by designating a minimum decoding capability of a target decoder which decodes layers to the number of layers, the encoding timing of the pictures of the low layer to be referred to and the encoding timing of the pictures in the high layer displayed immediately after decoding are decided (see FIG. 9). These encoding timings have the same meanings as the decoding timings read by the reception side from a compressed data buffer (coded picture buffer or cpb).

"cpb_removal_delay" is decided by reflecting the layer to which a picture is affiliated. For example, the number of layers is set to N and temporal_id (Tid) is set to have a value in the range of 0 to N−1. In addition, a minimum decoding capability is set to a capability of decoding a picture of a layer with temporal_id=K. The buffer delay control unit 122 obtains an encoding interval D between pictures of each layer using the following expression (1), and reflects the value in "cpb_removal_delay" and "dpb_output_delay."

$D=2^{}(N-1-K)(\text{Tid} \leq K)$ $D=2^{}(N-1-\text{Tid})(K<\text{Tid}<N-1)$ $D=\text{Input sequence interval}(\text{Tid}=N-1) \ldots (1)$   (1)

It should be noted that, when encoding timings of layers temporally overlap each other, lower layers are preferentially encoded and higher layers are encoded in the next timeslot assigned through the above expression.

The hypothetical reference decoder (HRD) setting unit 123 receives the supply of "cpb_removal_delay" and "dpb_output_delay" of the pictures of each layer calculated by the buffer delay control unit 122 and supply of the number of streams from the CPU 101. The HRD setting unit 123 performs HRD setting based on the information.

The parameter set/SEI encoding unit 124 receives the supply of temporal_id along with the HRD setting information. The parameter set/SEI encoding unit 124 generates parameter sets and SEI such as a VPS, an SPS (ESPS), and a PPS of the pictures of each layer according to the number of streams to be encoded.

For example, picture timing SEI that includes "cpb_removal_delay" and "dpb_output_delay" is generated. In addition, for example, buffereing period SEI including "initial_cpb_removal_time" is generated. The buffering period SEI is generated for the leading picture (access unit) of a GOP.

"initial cpb removal time" indicates a time (initial time) at which encoded image data of the leading picture of a group of pictures (GOP) is picked out from the compressed data buffer (cpb) during decoding. "cpb_removal_delay" indicates a time at which encoded image data of each picture is picked out from the compressed data buffer (cpb), and is decided in accordance with "initial_cpb_removal_time." In addition, "dpb_output_delay" indicates a time at which data is decoded, put into the uncompressed data buffer (dpb) and then picked out therefrom.

The slice encoding unit 125 obtains slice data (slice segment header and slice segment data) by encoding image data of the pictures of each layer. The slice decoding unit 125 inserts "ref_idx_10_active (ref_idx_11_active), which indicates an index of a picture that is a prediction destination of a "prediction unit," into the "slice segment header" as information indicating a state of time direction prediction using a frame buffer. Accordingly, during decoding, a reference source picture is decided along with the level of the layer indicated by temporal_id. In addition, the slice decoding unit 125 inserts the index of a current slice into the "slice segment header" as "short_term_ref_pic_set_idx" or "it_idx_sps."

The NAL packetizing unit 126 generates encoded image data of the pictures of each layer based on the parameter sets and SEI generated by the parameter set/SEI encoding unit 124 and the slice data generated by the slice encoding unit 125, and outputs video streams (encoded streams) equal in number to the number of streams.

At this time, temporal_id indicating the layer of each picture is added to the NAL unit header (see FIG. 4). In addition, a picture which is affiliated to the layer indicated by temporal_id is classified as a sublayer (sub_layer), and a level designation value "level_idc" of a bit rate of each sublayer is set to "sublayer_level_idc," and is inserted into the VPS or an SPS (ESPS).

Figure 13:
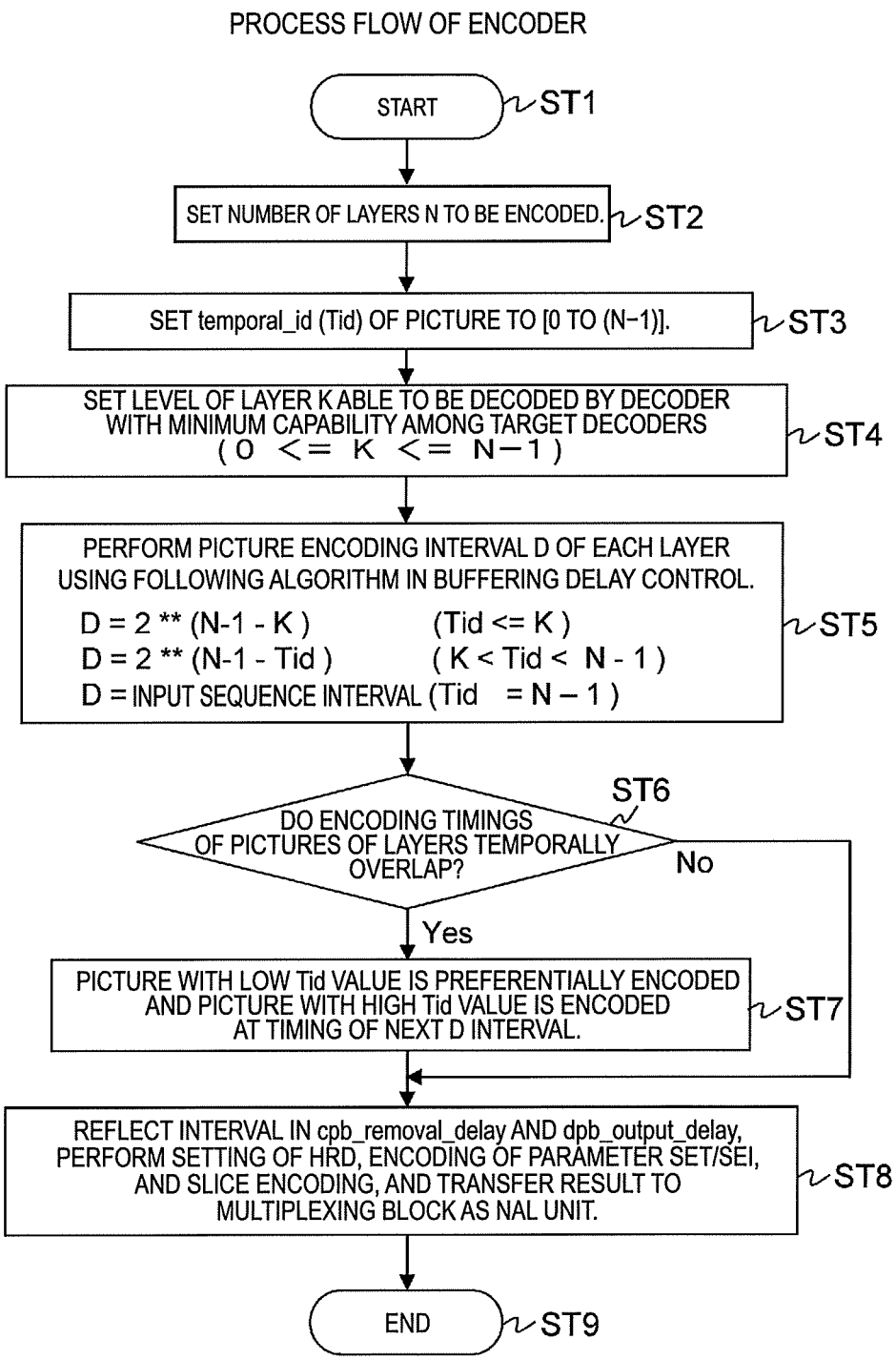
FIG. 13 is a diagram showing an example of a process flow of the encoder.

FIG. 13 shows a process flow of the encoder 102. The encoder 102 starts a process in Step ST1, and then moves to the process of Step ST2. In Step ST2, the encoder 102 sets the number of layers N for hierarchical encoding. Next, the encoder 102 sets temporal_id of pictures of each layer to 0 to (N−1) in Step ST3.

Then, in Step ST4, the encoder 102 sets the level of a layer K that a decoder with a minimum capability among target decoders can decode to a value in the range of 0 to (N−1).

Then, in Step ST5, the encoder 102 obtains a picture encoding interval D of each layer based on the above-described expression (1) using the buffer delay control unit 122.

Then, in Step ST6, the encoder 102 determines whether or not encoding timings of the pictures of layers temporally overlap. When the encoding timings overlap, the encoder 102 preferentially encodes the pictures of the lower layers and encodes the pictures of the higher layers at the timing of the next encoding interval D in Step ST7. Then, the encoder 102 moves to the process of Step ST8.

When the encoding timings do not overlap in Step ST6, the encoder 102 directly moves to Step ST8. In Step ST8, the encoder 102 reflects the encoding interval D of the pictures of each layer obtained in Step ST5 in "cpb_removal_delay" and "dpb_output_delay," performs setting of an HRD, encoding of the parameter sets/SEI, and slice encoding, and transfers the results to a multiplexing block in the form of NAL units. Then, the encoder 102 finishes the process in Step ST9.

Returning to FIG. 2, the compressed data buffer (cpb) 103 temporarily accumulates a video stream including the encoded data of the pictures of each layer generated by the encoder 102. The multiplexer 104 reads the video stream accumulated in the compressed data buffer 103, makes them into PES packets, further makes them into transport packets and multiplexes them, and thereby obtains a transport stream TS as a multiplexed stream.

This transport stream TS includes a single video stream having the encoded image data of the pictures of each layer, or a predetermined number of video streams having the encoded image data of the pictures of each layer set that is obtained by dividing the plurality layers into a predetermined number of layer sets, the number being equal to or greater than two. The multiplexer 104 inserts layer information and stream configuration information into the transport stream TS.

As program specific information (PSI), the transport stream TS includes a program map table (PMT). This PMT has a video elementary loop (video ES1 loop) with information relating to each video stream. In this video elementary loop, information of a stream type, a packet identifier (PID), and the like as well as a descriptor describing the information relating to the video stream are disposed to correspond to each video stream.

The multiplexer 104 inserts an HEVC descriptor (HEVC_descriptor) as one of the descriptors, and further inserts a newly defined scalability extension descriptor (scalability_extension_descriptor).

FIG. 14 shows a structure example (syntax) of the HEVC descriptor (HEVC_descriptor). FIG. 15 shows the content of principal information (semantics) of the structure example.

The 8-bit field of "descriptor_tag" indicates the type of the descriptor, indicating HEVC descriptor here. The 8-bit field of "descriptor_length" indicates the length (size) of the descriptor, showing the number of succeeding bytes as the length of the descriptor.

The 8-bit field of "level_idc" indicates the level designation value of a bit rate. In addition, in the case of "temporal_layer_subset_flag=1," the 5-bit field of "temporal_id_min" and the 5-bit field of "temporal_id_max" are present. "temporal_id_min" indicates the value of temporal_id of the lowest layer of hierarchically encoded data included in a corresponding video stream. "temporal_id_max" indicates the value of temporal_id of the highest layer of the hierarchically encoded data of the corresponding video stream.

The 1-bit field of "level_constrained_flag" is newly defined, indicating that there is an SPS or an ESPS in a corresponding substream and "general_level_idc" that is an element thereof has a value of a level which includes pictures equal to or lower than temporal_id (layer identification information) of the substream. "1" indicates that there are an SPS or an ESPS in the substream and "general_level_idc" that is an element thereof has a value of a level which includes pictures equal to or lower than temporal_id of the substream. "0" indicates that there is one SPS in a group of substreams constituting a target service and "general_level_idc" thereof has a value of a level which includes not only the substreams but also other substreams under the same service.

The 3-bit field of "scalability_id" is newly defined, indicating an ID which represents, when a plurality of video streams provide a scalable service, scalability given to the individual streams. "0" indicates the base stream and "1" to "7" are IDs increasing according to the degree of scalability from the base stream.

FIG. 16 shows a structure example (syntax) of a scalability extension descriptor (scalability_extension_descriptor). In addition, FIG. 17 shows the content of principal information (semantics) in the structure example.

The 8-bit field of "scalability_extension_descriptor_tag" indicates the type of the descriptor, indicating herein a scalability extension descriptor. The 8-bit field of "scalability_extension_descriptor_length" indicates a length (size) of the descriptor, indicating the number of succeeding bytes as the length of the descriptor. The 1-bit field of "extension_stream_existing_flag" is a flag indicating that there is an extended service based on another stream. "1" indicates that there is an extended stream and "0" indicates that there is no extended stream.

The 3-bit field of "extension_type" indicates the type of extension. "001" indicates that the extension is time-direction scalable. "010" indicates that the extension is spatial-direction scalable. "011" indicates that the extension is bit-rate scalable.

The 4-bit field of "number_of_streams" indicates the total number of streams involved in the distributed service. The 3-bit field of "scalability_id" is an ID which indicates, when a plurality of video streams provide a scalable service, scalability given to the individual streams. "0" indicates the base stream and "1" to "7" are IDs increasing the degree of scalability from the base stream. The 8-bit field of "minimum_target_decoder_level_idc" indicates a capability of a decoder that the streams target. This information is used when a receiver determines whether or not an expected decoding time of encoded pictures exceeds the range of the picture decoding processing capability of the decoder before the decoder decodes streams.

In this embodiment, the level designation value (general_level_idc) of the bit rate included in the SPS or ESPS and the like are used as identification information of an affiliated layer set when a plurality of layers are divided into a predetermined number of layer sets, the number being equal to or greater than two. The level designation value of each layer set is set to the value corresponding to the frame rate obtained from pictures of the layer set and pictures of all layer sets on the lower layer set side than the aforementioned layer set.

The multiplexer 104 sets a higher priority of a TS packet which contains encoded image data of a picture of a layer set on the lower layer side. When, for example, a plurality of layers are divided into two of a low layer set and a high layer set, the multiplexer 104 uses the 1-bit field of "transport_priority" of the TS packet header.

FIG. 18 shows a structure example (syntax) of a TS packet. The 1-bit field of "transport_priority" is set to "1" in the case of a TS packet which contains encoded image data of picture of the base layer, i.e., a layer set on the low layer side, and to "0" in the case of a TS packet which contains encoded image data of pictures of a non-base layer, i.e., a layer set on the high layer side.

Figure 19:
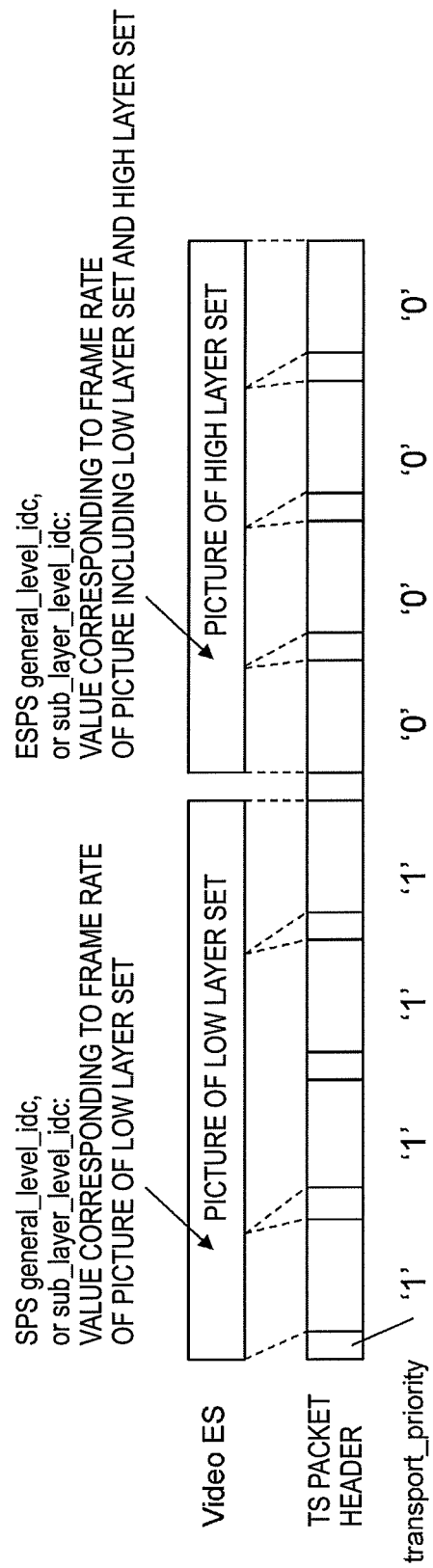
FIG. 19 is a diagram showing the relation between level designation values (general_level_idc) of bit rates included in VPSs and set values of "transport_priority" of a TS packet header.

FIG. 19 shows the relationship between level designation values (general_level_idc) of bit rates included in NAL units of an SPS and an ESPS and set values of "transport_priority" of a TS packet header. Using one or both types of information, a reception side can distinguish encoded image data of pictures of the layer set on the low layer side and encoded image data of pictures of the layer set on the high layer side.

Figure 20:
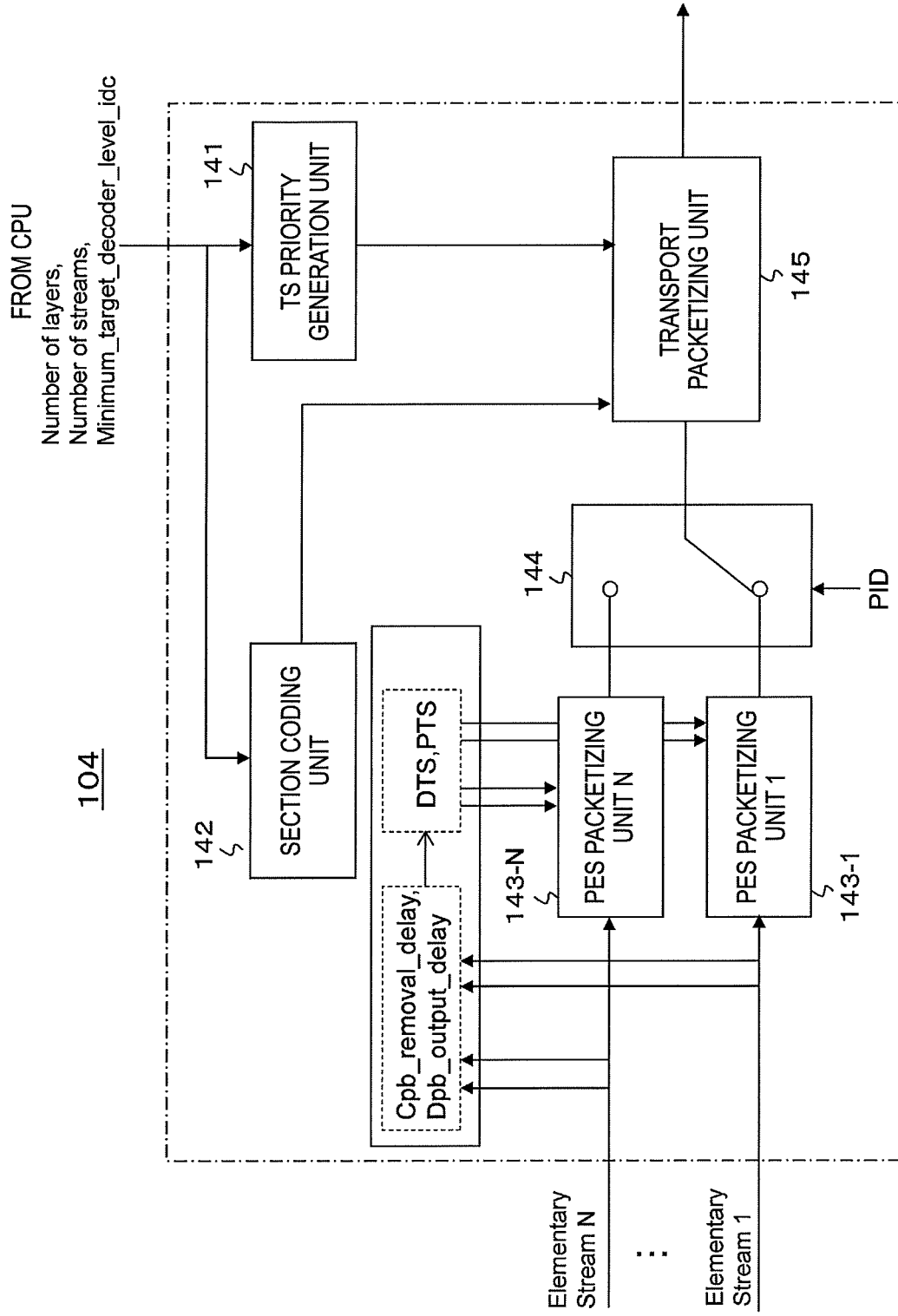
FIG. 20 is a block diagram showing a configuration example of a multiplexer.

FIG. 20 shows a configuration example of the multiplexer 104. The multiplexer has a TS priority generation unit 141, a section coding unit 142, a PES packetizing units 143-1 to 143-N, a switching unit 144, and a transport packetizing unit 145.

The PES packetizing units 143-1 to 143-N each read video streams 1 to N accumulated in the compressed data buffer 103 to generate PES packets. At this time, the PES packetizing units 143-1 to 143-N place time stamps such as decoding time stamps (DTSs) and presentation time stamps (PTSs) to PES headers based on HRD information of the video streams 1 to N, and in this case, "cpu_removal_delay" and "dpb_output_delay" of each picture are referred to, time stamps are converted into each DTS and PTS in synchronized precision with the time of a system time clock (STC), and disposed in predetermined positions of the PES headers.

The switching unit 144 selectively takes PES packets generated by the PES packetizing units 143-1 to 143-N based on packet identifiers (PIDs), and sends them to the transport packetizing unit 145. The transport packetizing unit 145 generates TS packets which include the PES packets in their payloads, and thereby obtains a transport stream.

The TS priority generation unit 141 receives supply of information of the number of layers and the number of streams from the CPU 101. The TS priority generation unit 141 generates priority of each layer set when a plurality of layers indicated by the number of layers is divided into a predetermined number of layer sets, the number being equal to or greater than two. When the layers are divided into two, for example, a value to be inserted into the 1-bit field of "transport_priority" of the TS packet header is generated (see FIG. 19).

The TS priority generation unit 141 sends information of the priority of each layer set to the transport packetizing unit 145. The transport packetizing unit 145 sets priority of each TS packet based on this information. In this case, a higher value is set as the priority of the TS packet which contains encoded image data of a picture of a layer set on the lower layer side as described above.

The section coding unit 142 receives supply of information on the number of layers, the number of streams, and the minimum target decoder level (minimum_target_decoder_level_idc) from the CPU 101. Based on this information, the section coding unit 142 generates various kinds of section data to be inserted into the transport stream TS, for example, the above-described HEVC descriptor (HEVC_descriptor), scalability extension descriptor (scalability_extension_descriptor), and the like.

The section coding unit 142 sends the various kinds of section data to the transport packetizing unit 145. The transport packetizing unit 145 generates TS packets including the section data and inserts them into the transport stream TS.

Figure 21:
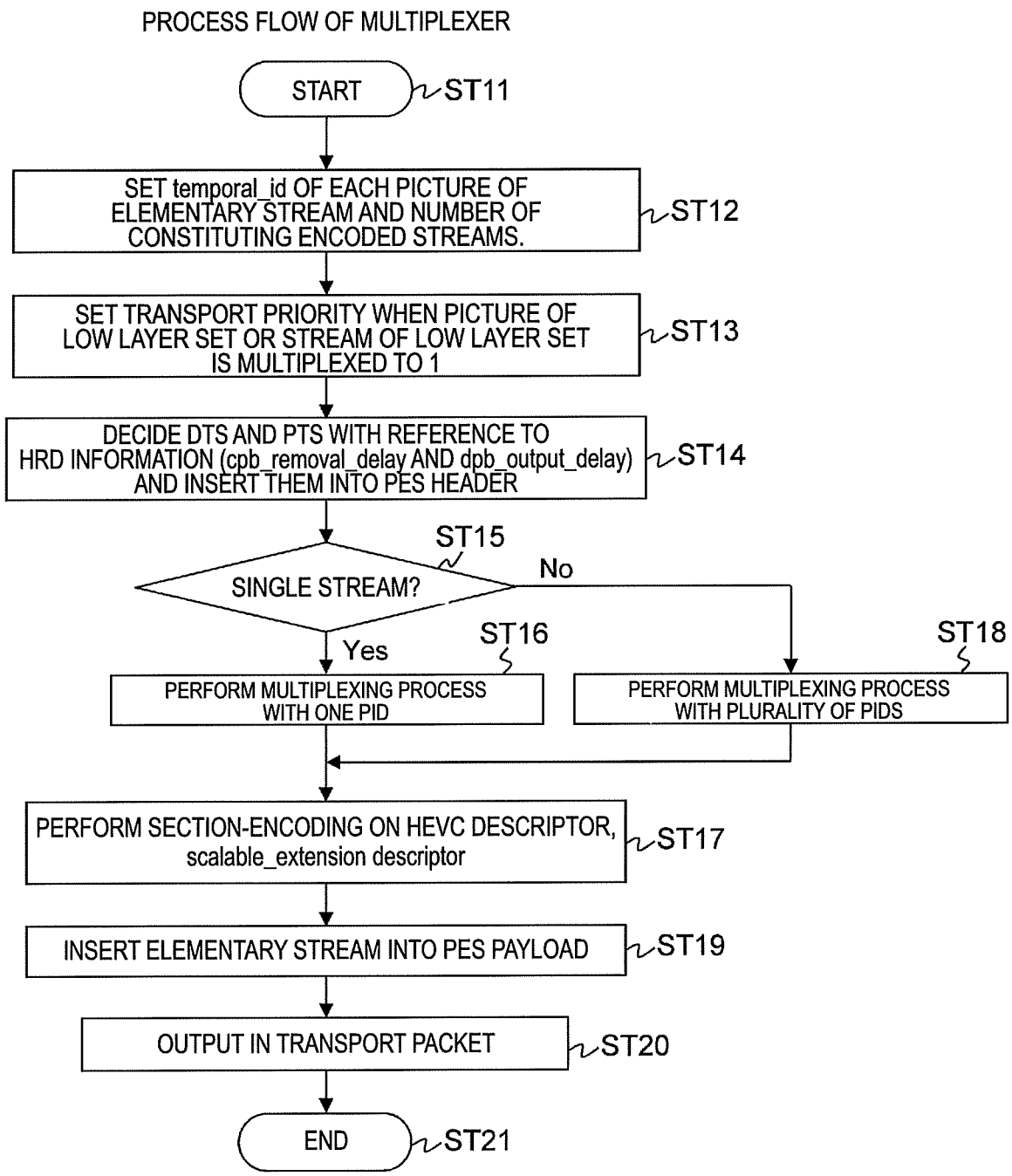
FIG. 21 is a diagram showing an example of a process flow of a multiplexer.

FIG. 21 shows a process flow of the multiplexer 104. This is an example in which a plurality of layers are divided into two including a low layer set and high layer set. The multiplexer 104 starts the process in Step ST11 and then moves to the process of Step ST12. In Step ST12, the multiplexer 104 sets temporal_id_of each picture of video streams (video elementary streams) and the number of constituting encoded streams.

Next, in Step ST13, the multiplexer 104 sets "transport_priority" when pictures of the low layer set or the video streams including the pictures of the low layer set are multiplexed to "1." In addition, in Step ST14, the multiplexer 104 decides a DTS and a PTS referring to the HRD information ("cpu_removal_delay" and "dpb_output_delay") and inserts them into the PES headers.

Next, the multiplexer 104 determines in Step ST15 whether or not there is a single stream. When there is a single stream, the multiplexer 104 executes a multiplexing process with one PID (packet identifier) in Step ST16, and then moves to the process of Step ST17. On the other hand, when there is no single stream, the multiplexer 104 executes a multiplexing process with a plurality of packet PIDs (packet identifiers) in Step ST18, and then moves to the process of Step ST17.

In Step ST17, the multiplexer 104 codes the HEVC descriptor, scalability extension descriptor, and the like. Then, the multiplexer 104 inserts the video streams into the PES payload to make PES packets in Step ST19, and then makes transport packets to obtain the transport stream TS in Step ST20. Then, the multiplexer 104 finishes the process in Step ST21.

Figure 22:
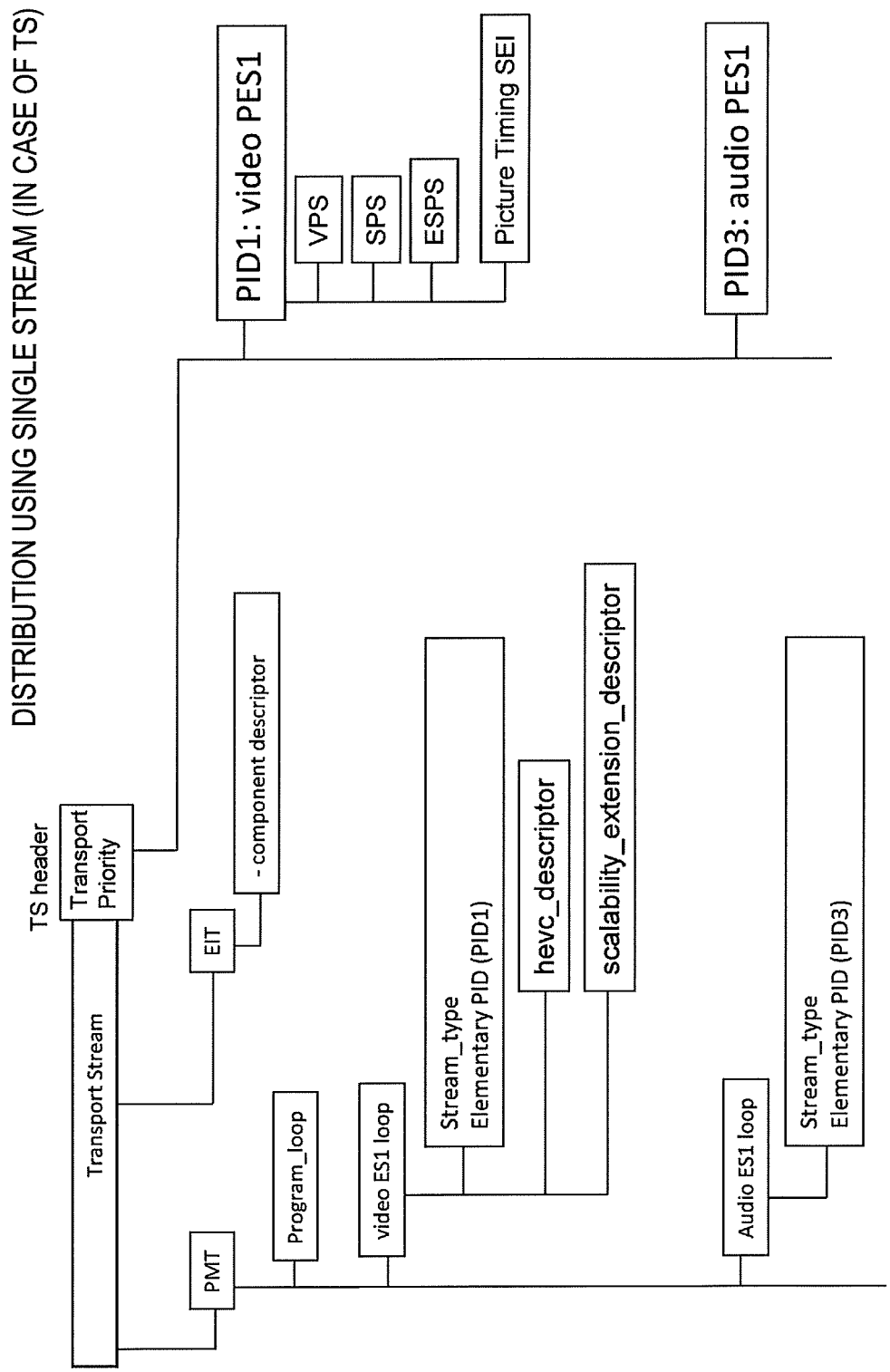
FIG. 22 is a diagram showing a configuration example of a transport stream TS when distribution is performed using a single stream.

FIG. 22 shows a configuration example of a transport stream TS when distribution is performed using a single video stream. This transport stream TS includes a single video stream. In other words, in this configuration example, there is a PES packet "video PES1" of the video stream having encoded image data of pictures of a plurality of layers in, for example, HEVC and a PES packet "audio PES1" of an audio stream.

This single video stream includes a predetermined number of substreams obtained by dividing a plurality of layers of hierarchical encoding into a predetermined number of layer sets, the number being equal to or greater than two. Here, a substream (base substream) of the lowest layer set includes an SPS and a substream (enhanced substream) of a higher layer set than the lowest one includes an ESPS. In addition, the value of "general_level_idc" of the elements of the SPS and ESPS is set to a value of a level which includes pictures of all layers included in a layer set equal to or lower than the corresponding layer set.

Encoded image data of each picture has NAL units such as a VPS, an SPS, an ESPS, an SEI, and the like. As described above, temporal_id, which indicates the layer of the picture, is inserted into the header of the NAL unit of each picture. In addition, for example, an SPS and an ESPS include the level designation value (general_level_idc) of a bit rate. In addition, for example, picture timing SEI includes "cpb_removal_delay" and "dpb_output_delay."

It should be noted that there is a field which indicates priority of 1 bit of "transport_priority" in the header of a TS packet which contains encoded image data of each picture. With this "transport_priority," it is possible to identify whether the contained encoded image data is of a picture of a low layer set or of a picture of a high layer set.

In addition, the transport stream TS includes a program map table (PMT) as program specific information (PSI). This PSI is information describing to which program each elementary stream included in the transport stream is affiliated.

In the PMT, there is a program loop describing information relating to an entire program. In addition, in the PMT, there is an elementary loop having information relating to each elementary stream. In this configuration example, there are a video elementary loop (video ES1 loop) and an audio elementary loop (audio ES1 loop).

In the video elementary loop, information of the type of stream, a packet identifier (PID), and the like are disposed, and descriptors describing information relating to the video stream are also described corresponding to the video stream (video PES1). As one of the descriptors, the above-described HEVC descriptor (HEVC descriptor) and scalability extension descriptor (scalability_extension_descriptor) are inserted.

Figure 23:
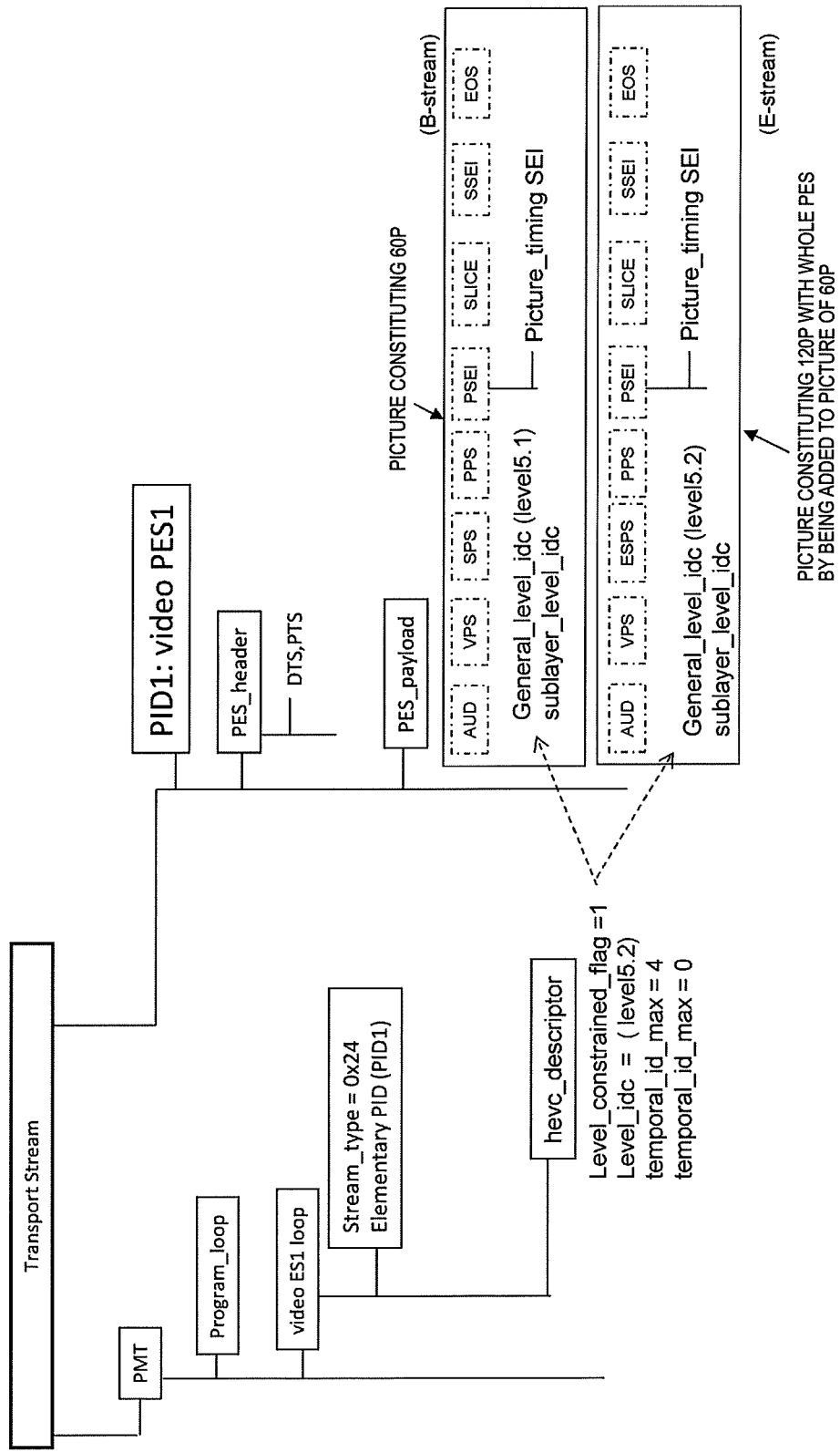
FIG. 23 is a diagram showing a specific configuration example of the transport stream TS when distribution is performed using a single stream.

FIG. 23 shows a case in which, in the example of hierarchical coding of FIG. 3, a base substream (B stream) is generated with the pictures of Layers 0 to 3 and an enhanced substream (E stream) is generated with the pictures of Layer 4. In this case, the respective pictures included in the base substream constitute 60 P and the respective pictures included in the enhanced substream (E stream) constitute 120 P in addition to the pictures included in the base substream in the whole PES.

The pictures of the base substream are composed of NAL units such as an "AUD," "VPS," "SPS," "PPS," "PSEI," "SLICE," "SSEI," and "EOS." The "VPS" and "SPS" are inserted into, for example, the leading picture of a GOP. The value of "general_level_idc" that is an element of the SPS is set to "level 5.1." The "EOS" may be omitted.

On the other hand, the pictures of the enhanced substream are composed of NAL units such as an "AUD," "ESPS," "PPS," "PSEI," "SLICE," "SSEI," and "EOS." The "ESPS" is inserted into, for example, the leading picture of a GOP. The value of "general_level_idc" that is an element of the ESPS is set to "level 5.2." The "PSEI," "SSEI," and "EOS" may be omitted.

In the "video ES1 loop," information of the type of the stream, a packet identifier (PID), and the like are disposed and a descriptor describing information relating to the video stream is also disposed to correspond to the video stream (video PES1). The type of this stream is set to "0×24" indicating a base stream. In addition, as one descriptor, the above-described HEVC descriptor is inserted.

The 1-bit field of "level_constrained_flag" is set to "1." This indicates "there is an SPS or an ESPS in the substream and 'general_level_idc' that is an element thereof has a value of a level which includes pictures equal to or lower than temporal_id included in the substream." In addition, the value of "level_idc" is set to "level 5.2" which indicates the values of entire levels of the video stream (video PES1). In addition, "temporal_id_min" is set to 0, and "temporal_id_max" is set to 4, which indicate that the video stream (video PES1) includes the pictures of Layers 0 to 4.

When such distribution using the single video stream is performed, the reception side determines whether or not respective substreams fall into the range of its own decoder processing capability based on "level_constrained_flag" and "general_level_idc" of the elements of the SPS and ESPS, and performs decoding on the substreams included in the range.

Figure 24:
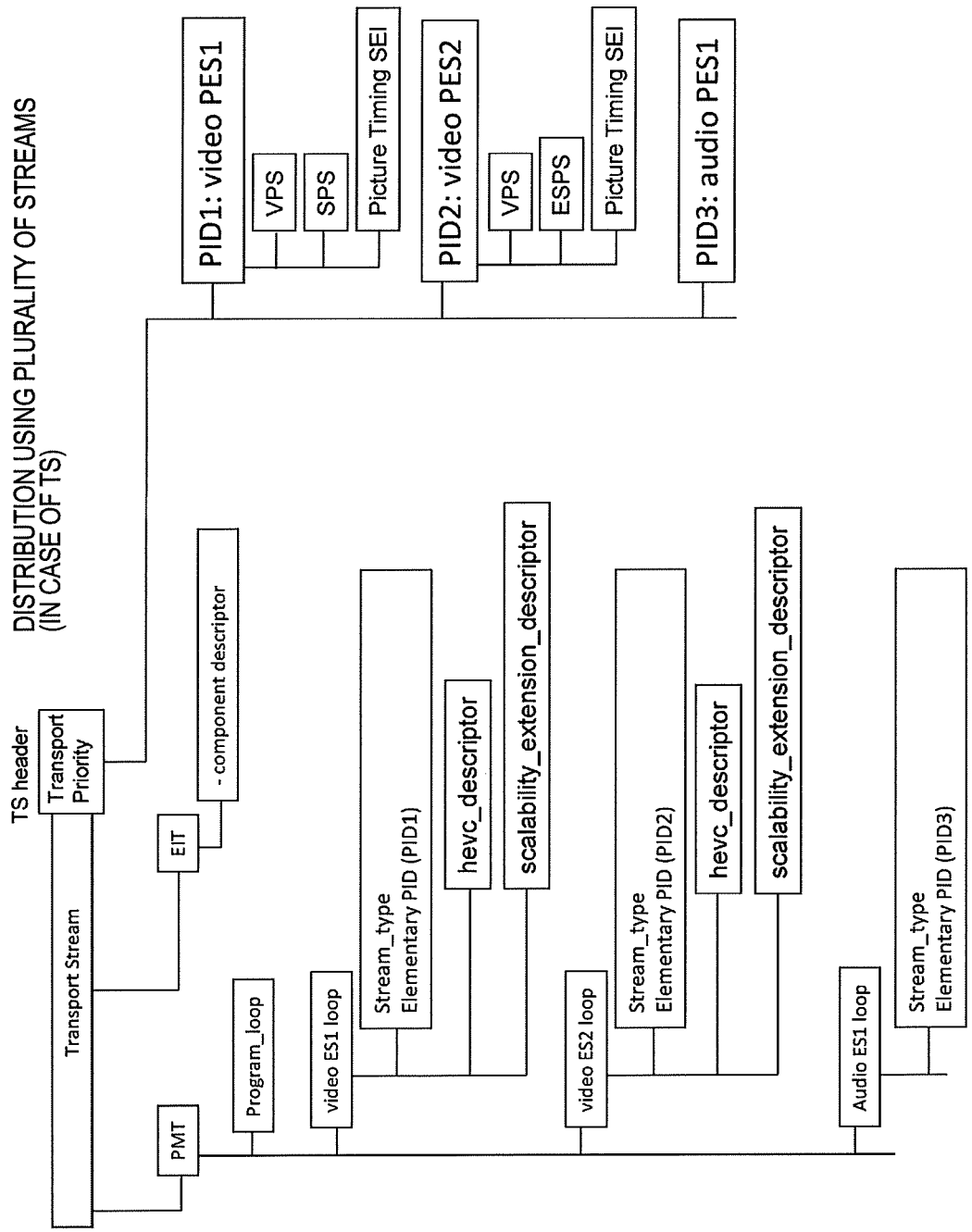
FIG. 24 is a diagram showing a configuration example of a transport stream when distribution is performed using a plurality of streams (two streams).

FIG. 24 shows a configuration example of a transport stream TS when distribution is performed using a plurality of streams, i.e., using two streams here. This transport stream TS includes two video streams. In other words, in this configuration example, a plurality of layers are divided into two layer sets including a low layer set and a high layer set, and PES packets "video PES1" and "video PES2" of the video streams having encoded image data of pictures of the two layer sets in, for example, HEVC and a PES packet "audio PES1" of an audio stream are present.

The two video streams include each of two substreams obtained by dividing the plurality of layers of hierarchical encoding into two layer sets. Here, the substream of the low layer set (base substream) includes an SPS, and the substream of the high layer set (enhanced substream) includes an ESPS. In addition, the value of "general_level_idc" of the elements of the SPS and ESPS is set to the value of the level which includes pictures of all layers included in a layer set equal to or lower than the corresponding layer set.

In encoded image data of each picture, there are NAL units such as the SPS, ESPS, and the like. As described above, temporal_id indicating the layer of each picture is inserted into the headers of the NAL units of the picture. In addition, the level designation value (general_level_idc) of a bit rate is included in, for example, the SPS and ESPS. In addition, picture timing SEI includes, for example, "cpb_removal_delay" and "dpb_output_delay."

In addition, a field indicating priority of 1 bit of "transport_priority" is present in the header of the TS packet which contains the encoded image data of each picture. With this "transport_priority," it is possible to identify whether the contained encoded image data is of a picture of a low layer set or of a picture of a high layer set.

In addition, the transport stream TS includes a program map table (PMT) as program specific information (PSI). This PSI is information describing to which program each elementary stream in the transport stream is affiliated.

In the PMT, there is a program loop describing information regarding the entire program. In addition, in the PMT, there is an elementary loop having information relating to each elementary stream. In this configuration example, there are two video elementary loops (video ES1 loop and video ES2 loop) and an audio elementary loop (audio ES1 loop).

In each video elementary loop, information of the type of the streams, a packet identifier (PID), and the like are disposed, and descriptors describing information relating to the video streams are also described corresponding to the video streams (video PES1 and video PES2). As one of the descriptors, the above-described HEVC descriptor (HEVC_descriptor) and scalability extension descriptor (scalability_extension_descriptor) are inserted.

Figure 25:
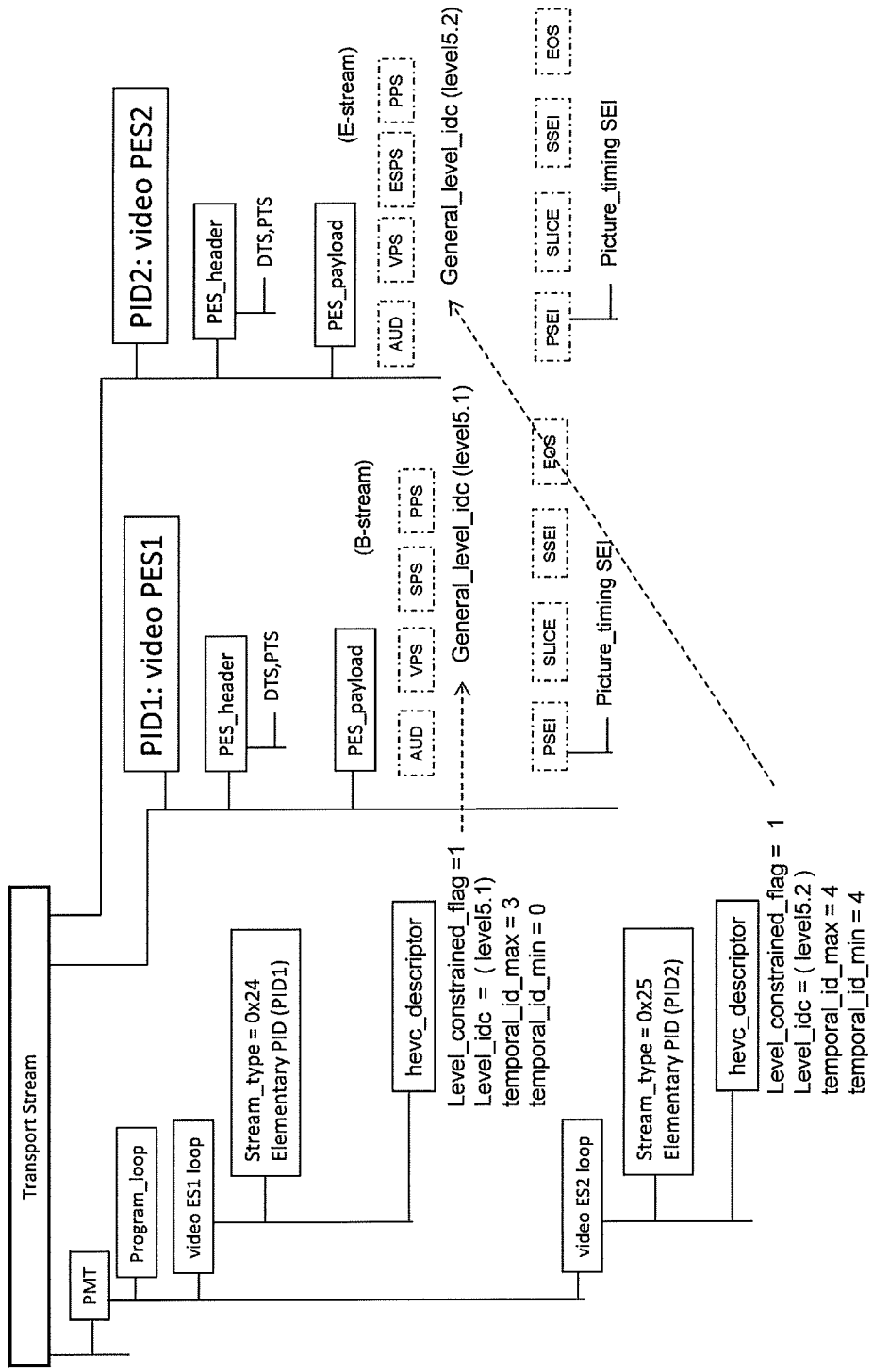
FIG. 25 is a diagram showing a specific configuration example of the transport stream TS when distribution is performed using two streams.

FIG. 25 shows a case in which, in the example of hierarchical coding of FIG. 3, a base substream (B stream) is generated with the pictures of Layers 0 to 3 and an enhanced substream (E stream) is generated with the pictures of Layer 4. In this case, the respective pictures included in the base substream constitute 60 P and the respective pictures included in the enhanced substream (E stream) constitute 120 P in addition to the pictures included in the base substream in the whole PES.

The pictures of the base substream are composed of NAL units such as an "AUD," "VPS," "SPS," "PPS," "PSEI," "SLICE," "SSEI," and "EOS." The "VPS" and "SPS" are inserted into, for example, the leading picture of a GOP. The value of "general_level_idc" that is an element of the SPS is set to "level 5.1." The "EOS" may be omitted.

On the other hand, the pictures of the enhanced substream are composed of NAL units such as an "AUD," "ESPS," "PPS," "PSEI," "SLICE," "SSEI," and "EOS." The "ESPS" is inserted into, for example, the leading picture of a GOP. The value of "general_level_idc" that is an element of the ESPS is set to "level 5.2." The "PSEI," "SSEI," and "EOS" may be omitted.

In the "video ES1 loop," information of the type of the stream, a packet identifier (PID), and the like are disposed and a descriptor describing information relating to the video stream is also disposed to correspond to the video stream (video PES1). The type of this stream is set to "0x24" indicating a base stream. In addition, as one descriptor, the above-described HEVC descriptor is inserted.

The 1-bit field of "level_constrained_flag" is set to "1." This indicates "there is an SPS or an ESPS in the substream and 'general_level_idc' that is an element thereof has a value of a level which includes pictures equal to or lower than temporal_id included in the substream." In addition, the value of "level_idc" is set to "level 5.1" which indicates the value of the level of the base substream (B stream). In addition, "temporal_id_min" is set to 0, and "temporal_id_max" is set to 3, which indicate that the base substream (B stream) includes the pictures of Layers 0 to 3.

In the "video ES2 loop," information of the type of the stream, a packet identifier (PID), and the like are disposed and a descriptor describing information relating to the video stream is also disposed to correspond to the video stream (video PES2). The type of the stream is set to "0x25" which indicates an enhanced stream. In addition, as one descriptor, the above-described HEVC descriptor is inserted.

The 1-bit field of "level_constrained_flag" is set to "1." This indicates "there is an SPS or an ESPS in the substream and 'general_level_idc' that is an element thereof has a value of a level which includes pictures equal to or lower than temporal_id included in the substream." In addition, the value of "level idc" is set to "level 5.2" which indicates the values of the levels of the base substream (B stream) and the enhanced stream (E stream). In addition, "temporal_id_min" is set to 4, and "temporal_id_max" is set to 4, which indicate that the enhanced stream (E stream)) includes the pictures of Layer 4.

When such distribution using the plurality of video streams is performed, the reception side determines whether or not respective substreams fall into the range of its own decoder processing capability based on "level_constrained_flag" and "general_level_idc" of the elements of the SPS and ESPS, and performs decoding on the substreams included in the range.

Figure 26:
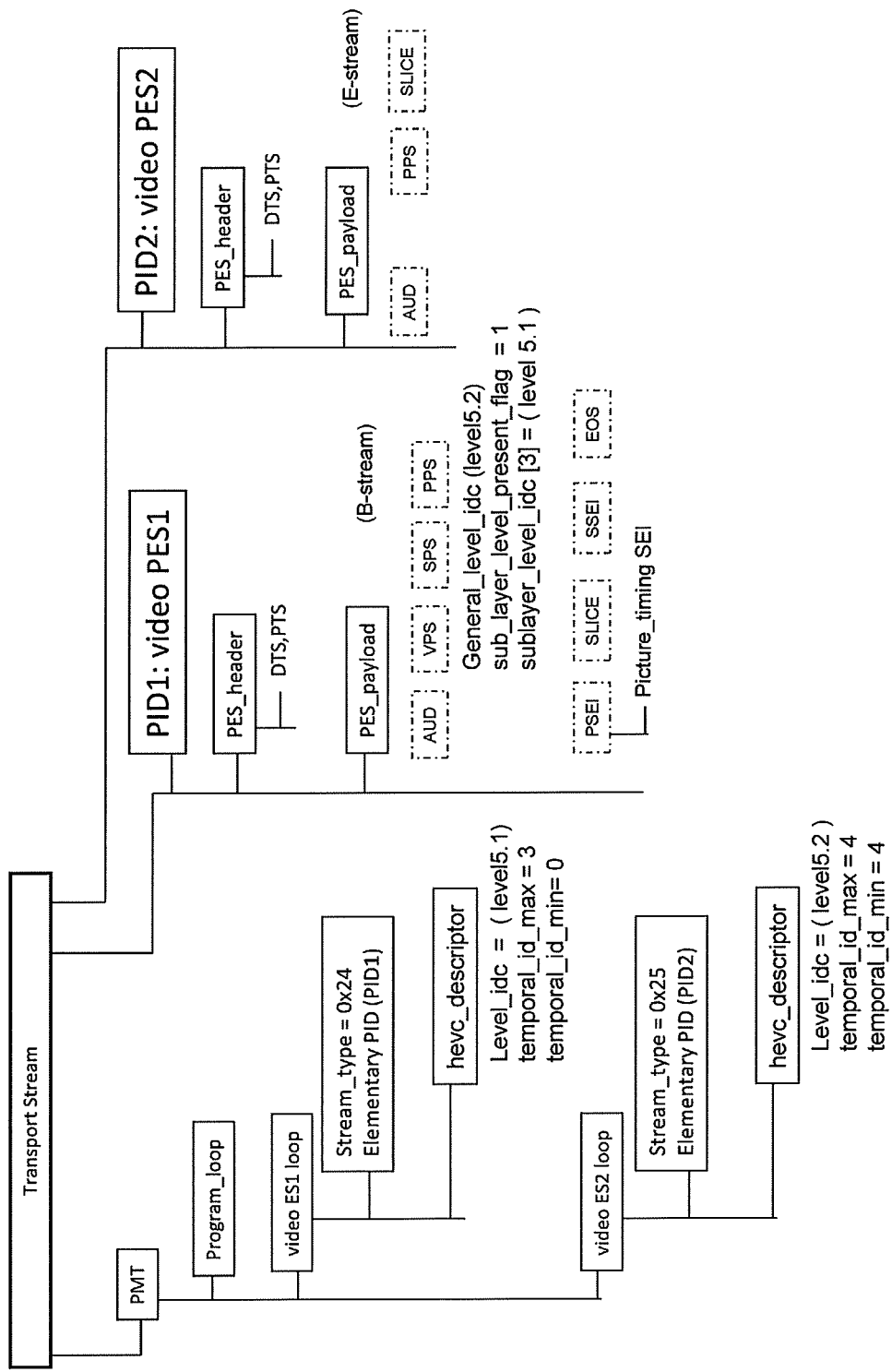
FIG. 26 is a diagram showing another specific configuration example of the transport stream TS when distribution is performed using two streams.

FIG. 26 shows another configuration example of the transport stream TS in a case in which, in the example of hierarchical coding of FIG. 3, a base substream (B stream) is generated with the pictures of Layers 0 to 3 and an enhanced substream (E stream) is generated with the pictures of Layer 4. In this case, the respective pictures included in the base substream constitute 60 P and the respective pictures included in the enhanced substream (E stream) constitute 120 P in addition to the pictures included in the base substream in the whole PES.

The pictures of the base substream are composed of NAL units such as an "AUD," "VPS," "SPS," "PPS," "PSEI," "SLICE," "SSEI," and "EOS." The "VPS" and "SPS" are inserted into, for example, the leading picture of a GOP. The value of "general_level_idc" that is an element of the SPS is set to "level 5.2." In this case, "sub_layer_level_present_flag" that is an element of the SPS is set to "1," and in "sublayer_level_idc[3]," the value of the level "level 5.1" of the base substream is indicated. "EOS" may be omitted.

The pictures of the enhanced substream are composed of NAL units such as an "AUD," "PPS," and "SLICE." However, the NAL unit of "ESPS" as shown in FIG. 25 is not present.

In the "video ES1 loop," information of the type of the stream, a packet identifier (PID), and the like are disposed and a descriptor describing information relating to the video stream is also disposed to correspond to the video stream (video PES1). The type of this stream is set to "0x24" indicating a base stream. In addition, as one descriptor, the above-described HEVC descriptor is inserted.

There is no "level_constrained_flag" as shown in FIG. 25. The value of "level_idc" is set to "level 5.1" indicating the value of the level of the base substream (B stream). In addition, "temporal_id_min" is set to 0, and "temporal_id_max" is set to 3, which indicate that the base substream (B stream) includes the pictures of Layers 0 to 3.

In the "video ES2 loop," information of the type of the stream, a packet identifier (PID), and the like are disposed and a descriptor describing information relating to the video stream is also disposed to correspond to the video stream (video PES2). The type of the stream is set to "0x25" which indicates an enhanced stream. In addition, as one descriptor, the above-described HEVC descriptor is inserted.

There is no "level_constrained_flag" as shown in FIG. 25. The value of "level_idc" is set to "level 5.2" indicating the values of the levels of the base substream (B stream) and the enhanced stream (E stream). In addition, "temporal_id_min" is set to 4, and "temporal_id_max" is set to 4, which indicate that the enhanced stream (E stream)) includes the pictures of Layer 4.

When such distribution using the plurality of video streams is performed, the reception side determines whether or not respective substreams fall into the range of its own decoder processing capability based on "general_level_idc" and "sublayer_level_idc" of the elements of the SPS, and performs decoding on the substreams included in the range.

Returning to FIG. 2, the transmission unit 105 modulates the transport stream TS in a modulation scheme proper for broadcasting, for example, QPSK-OFDM, and transmits an RF modulation signal from a transmission antenna.

An operation of the transmission device 100 shown in FIG. 2 will be briefly described. The encoder 102 receives an input of uncompressed dynamic image data. The encoder 102 performs hierarchical encoding on this dynamic image data. In other words, the encoder 102 classifies image data of respective pictures constituting the dynamic image data into a plurality of layers and encodes the data, and thereby generates a video stream having encoded image data of the pictures of each layer. At this time, encoding is performed such that a picture to be referred to is affiliated to its own layer and/or a layer lower than its own layer.

The encoder 102 generates the video stream having the encoded image data of the pictures of each layer. For example, the encoder 102 divides the plurality of layers into a predetermined number of layer sets, the number being equal to or greater than two, and generates a predetermined number of video streams which include each substream corresponding to each layer set or generates a single video stream which includes all substreams corresponding to each layer set.

The encoder 102 adds identification information for identifying an affiliated layer set to the encoded image data of the pictures of each layer set. In this case, as the identification information, for example, "general_level_idc" which is an element of an SPS, and an ESPS is used. The SPS is included in the substream of the lowest layer set (base substream) for each sequence (GOP). On the other hand, the ESPS is included in the substream of a higher layer set than the lowest one (enhanced substream) for each sequence (GOP). A higher layer set has a higher value of "general_level_idc" included in the SPS and the ESPS. For example, the value of "general_level_idc" included in the SPS and the ESPS of the substream of each layer set is set to the value of a level which includes pictures of all layers included in a layer set equal to or lower than the corresponding layer set.

The video stream which is generated by the encoder 102, including the encoded data of the pictures of each layer, is supplied to the compressed data buffer (cpb) 103 and temporarily stored therein. In the multiplexer 104, the video stream accumulated in the compressed data buffer 103 is read, PES packetized, and further transport packetized and multiplexed, and thereby a transport stream TS is obtained as a multiplexed stream.

This transport stream TS includes a single video stream or a predetermined number of video streams, the number being equal to or greater than two, having the encoded image data of the pictures of each layer. In the multiplexer 104, layer information and stream configuration information are inserted into the transport stream TS. In other words, in the multiplexer 104, an HEVC descriptor (HEVC_descriptor) and a scalability extension descriptor (scalability_extension_descriptor) are inserted into a video elementary loop corresponding to each video stream.

The multiplexer 104 sets a higher priority of a TS packet which contains the encoded image data of a picture of a layer set on the lower layer side. When, for example, the plurality of layers are divided into two including a low layer set and a high layer set, the multiplexer 104 uses the 1-bit field of "transport_priority" of the TS packet header to set the priority.

The transport stream TS generated by the multiplexer 104 is sent to the transmission unit 105. In the transmission unit 105, the transport stream TS is modulated in a modulation scheme proper for broadcasting, for example, QPSK-OFDM, and an RF modulation signal is transmitted from a transmission antenna.

Configuration of a Reception Device

Figure 27:
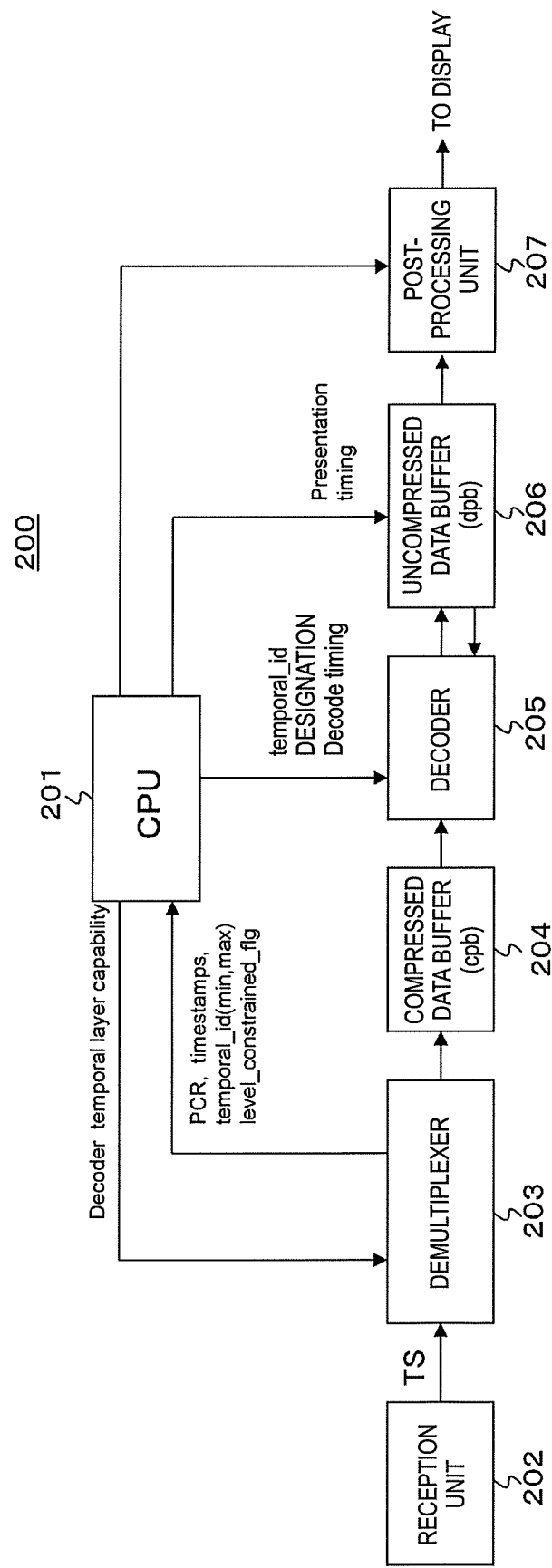
FIG. 27 is a block diagram showing a configuration example of a reception device.

FIG. 27 shows a configuration example of the reception device 200. This reception device 200 has a central processing unit (CPU) 201, a reception unit 202, a demultiplexer 203, and a compressed data buffer (coded picture buffer or cpb) 204. Further, the reception device 200 has a decoder 205, an uncompressed data buffer (decoded picture buffer or dpb) 206, and a post-processing unit 207. The CPU 201 constitutes a control unit which controls operations of each unit of the reception device 200.

The reception unit 202 demodulates an RF modulation signal received by a reception antenna to acquire a transport stream TS. The demultiplexer 203 selectively takes out encoded image data of pictures of layer sets from the transport stream TS according to a decoding capability (decoder temporal layer capability) and sends the data to the compressed data buffer (coded picture buffer or cpb) 204.

Figure 28:
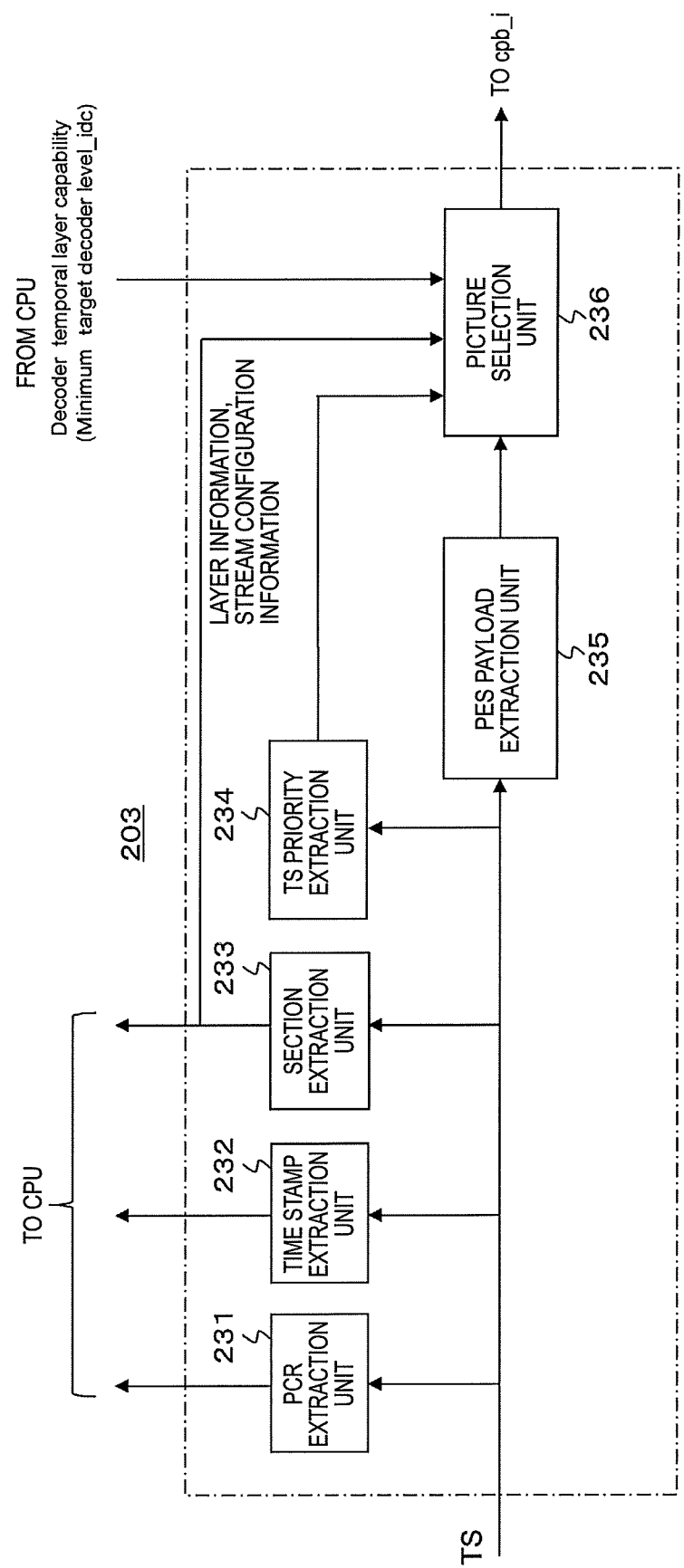
FIG. 28 is a block diagram showing a configuration example of a demultiplexer.

FIG. 28 shows a configuration example of the demultiplexer 203. This demultiplexer 203 has a PCR extraction unit 231, a time stamp extraction unit 232, a section extraction unit 233, a TS priority extraction unit 234, a PES payload extraction unit 235, and a picture selection unit 236.

The PCR extraction unit 231 extracts a PCR (program clock reference) from a TS packet which includes a PCR and sends the PCR to the CPU 201. The time stamp extraction unit 232 extracts a time stamp (DTS or PTS) inserted into the PES header for each picture, and sends the time stamp to the CPU 201. The section extraction unit 233 extracts section data from the transport stream TS and sends the data to the CPU 201. This section data includes the above-described HEVC descriptor (HEVC_descriptor), scalability extension descriptor (scalability_extension_descriptor), and the like.

The TS priority extraction unit 234 extracts priority information set for each TS packet. This priority is the priority of each layer set when the plurality of layers are divided into a predetermined number of layer sets, the number being equal to or greater than two, and layer sets on the lower layer side are set to have higher priorities as described above. For example, when layer sets are divided into two including a low layer set and a high layer set, the value of the 1-bit field of "transport_priority" of the TS packet header is extracted. This value is set to "1" for the low layer set and "0" for the high layer set.

The PES payload extraction unit 235 extracts the PES payload, i.e., the encoded image data of pictures of each layer, from the transport stream TS. The picture selection unit 236 selectively takes encoded image data of a picture of a layer set from the encoded image data of the pictures of each layer taken by the PES payload extraction unit 235 according to the decoding capability (decoder temporal layer capability), and sends the data to the compressed data buffer (coded picture buffer or cpb) 204. In this case, the picture selection unit 236 refers to layer information and stream configuration information obtained by the section extraction unit 233, and priority information extracted by the TS priority extraction unit 234.

A case in which, for example, a frame rate of a video stream included in the transport stream TS (encoded stream) is 120 fps is considered. It is assumed that, for example, a plurality of layers are divided into two including a layer set on the low layer side and a layer set on the high layer side and frame rates of pictures of the respective layer sets are 60 fps. In the above-described example of hierarchical encoding shown in FIG. 3, for example, Layers 0 to 3 are set to be affiliated to the layer set on the low layer side and Layer 4 is set to be affiliated to the layer set on the high layer side.

The 1-bit field of "transport_priority" included in the header of a TS packet is set to "1" in the case of a TS packet which contains encoded image data of picture of the base layer, i.e., a layer set on the low layer side, and to "0" in the case of a TS packet which contains encoded image data of pictures of a non-base layer, i.e., a layer set on the high layer side.

In this case, the transport stream TS may include a single video stream (encoded stream) having encoded data of pictures of each layer (see FIG. 10). In addition, in this case, the transport stream TS may include two video streams (encoded streams) which are a base stream (B-stream) having encoded image data of pictures of the layer set on the low layer side and an enhanced stream (E-stream) having encoded image data of pictures of the layer set on the high layer side (see FIG. 11).

When the decoding capability is equivalent to 120 P (120 fps), for example, the picture selection unit 236 takes the encoded image data of the pictures of all layers and sends the data to the compressed data buffer (cpb) 204. On the other hand, when the decoding capability is equivalent not to 120 P but to 60 P (60 fps), for example, the picture selection unit 236 only takes the encoded image data of the pictures of the layer set on the low layer side and sends the data to the compressed data buffer (cpb) 204.

Figure 29:
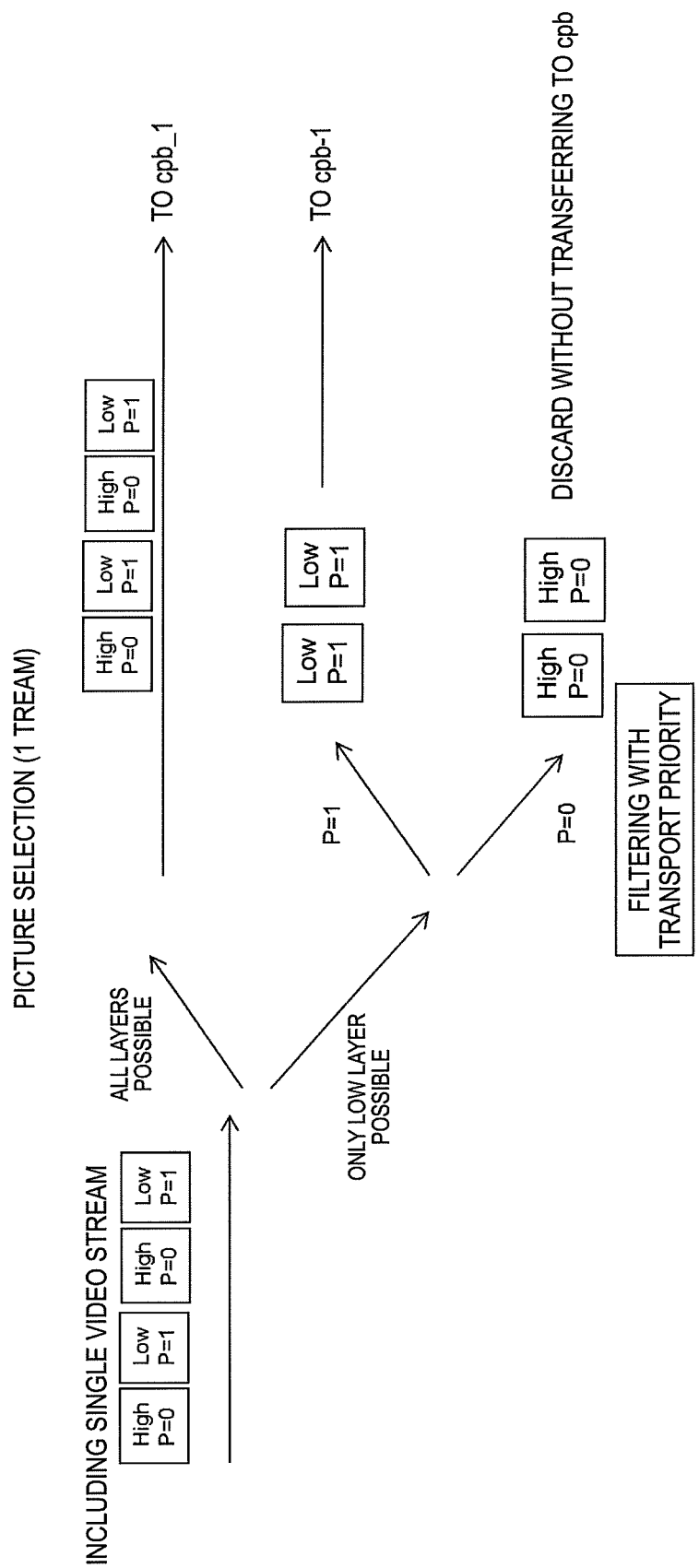
FIG. 29 is a diagram showing a case in which a single video stream (encoded stream) is included in a transport stream TS.

FIG. 29 shows a case in which a single video stream (encoded stream) is included in a transport stream TS. Here, "High" indicates the pictures of the layer set on the high layer side, and "Low" indicates the picture of the layer set on the low layer side. In addition, "P" indicates "transport_priority."

When the decoding capability is equivalent to 120 P, the picture selection unit 236 takes the encoded image data of the pictures of all layers, sends the data to the compressed data buffer (cpb) 204 to be accumulated in a region 1 (cpb_1). On the other hand, when the decoding capability is equivalent not to 120 P but to 60 P (60 fps), filtering is performed based on "transport_priority," and only the pictures of the layer set on the low layer side with P=1 are taken, sent to the compressed data buffer (cpb) 204, and accumulated in the region 1 (cpb_1).

Figure 30:
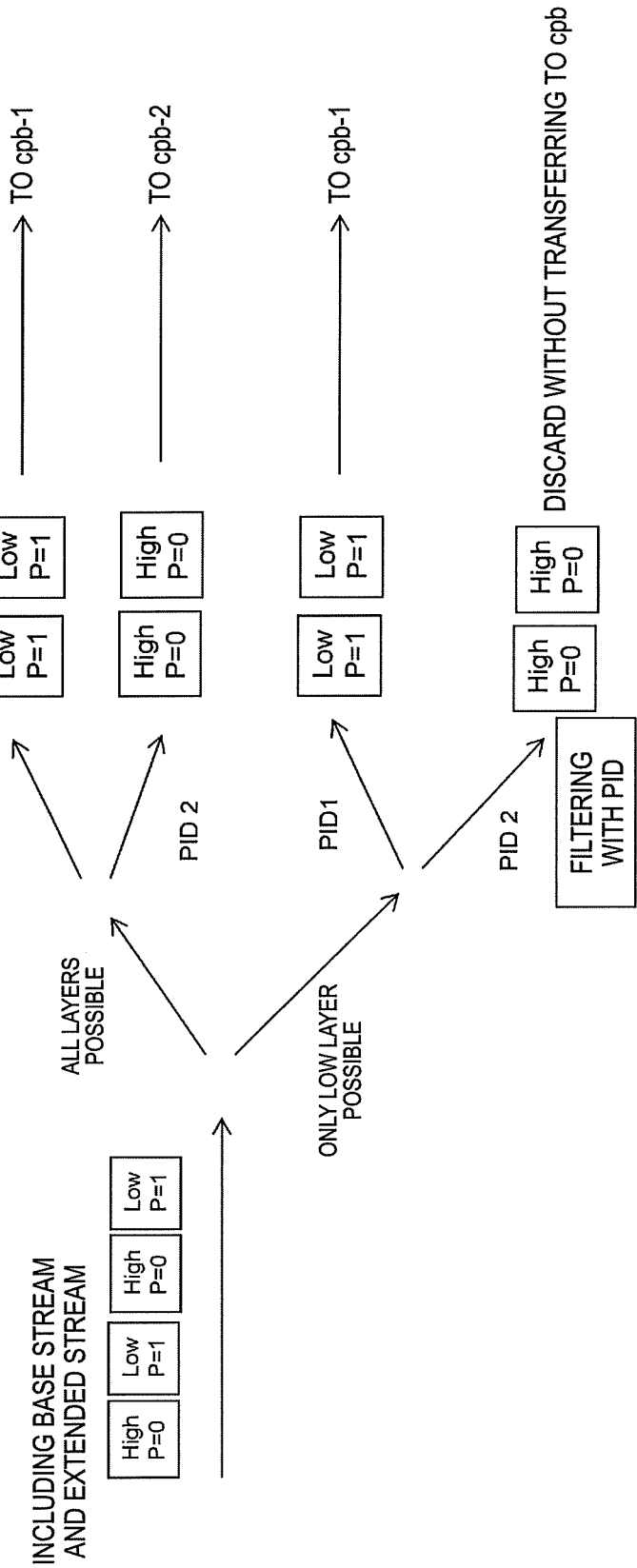
FIG. 30 is a diagram showing a case in which two video streams (encoded streams) including a base stream and an extended stream are included in a transport stream TS.

FIG. 30 shows a case in which two video streams (encoded streams) including a base stream and an extended stream are included in a transport stream TS. Here, "High" indicates the pictures of the layer set on the high layer side and "Low" indicates the pictures of the layer set on the low layer side. In addition, "P" indicates "transport_priority." Further, the packet identifier (PID) of the base stream is set to PID1, and the packet identifier (PID) of the extended stream is set to PID2.

When the decoding capability is equivalent to 120 P, the picture selection unit 236 takes the encoded image data of the pictures of all layers and sends the data to the compressed data buffer (cpb) 204. Then, the encoded image data of the pictures of the layer set on the low layer side is accumulated in the region 1 (cpb_1) and the encoded image data of the pictures of the layer set on the low layer side is accumulated in a region 2 (cpb_2)

On the other hand, when the decoding capability is equivalent not to 120 P but to 120 P, only the pictures of the layer set on the low layer side with PID1 are taken through filtering based on the packet identifiers (PIDs), sent to the compressed data buffer (cpb) 204, and accumulated in the region 1 (cpb_1). It should be noted that the filtering may also be performed based on "transport_priority" in this case.

Figure 31:
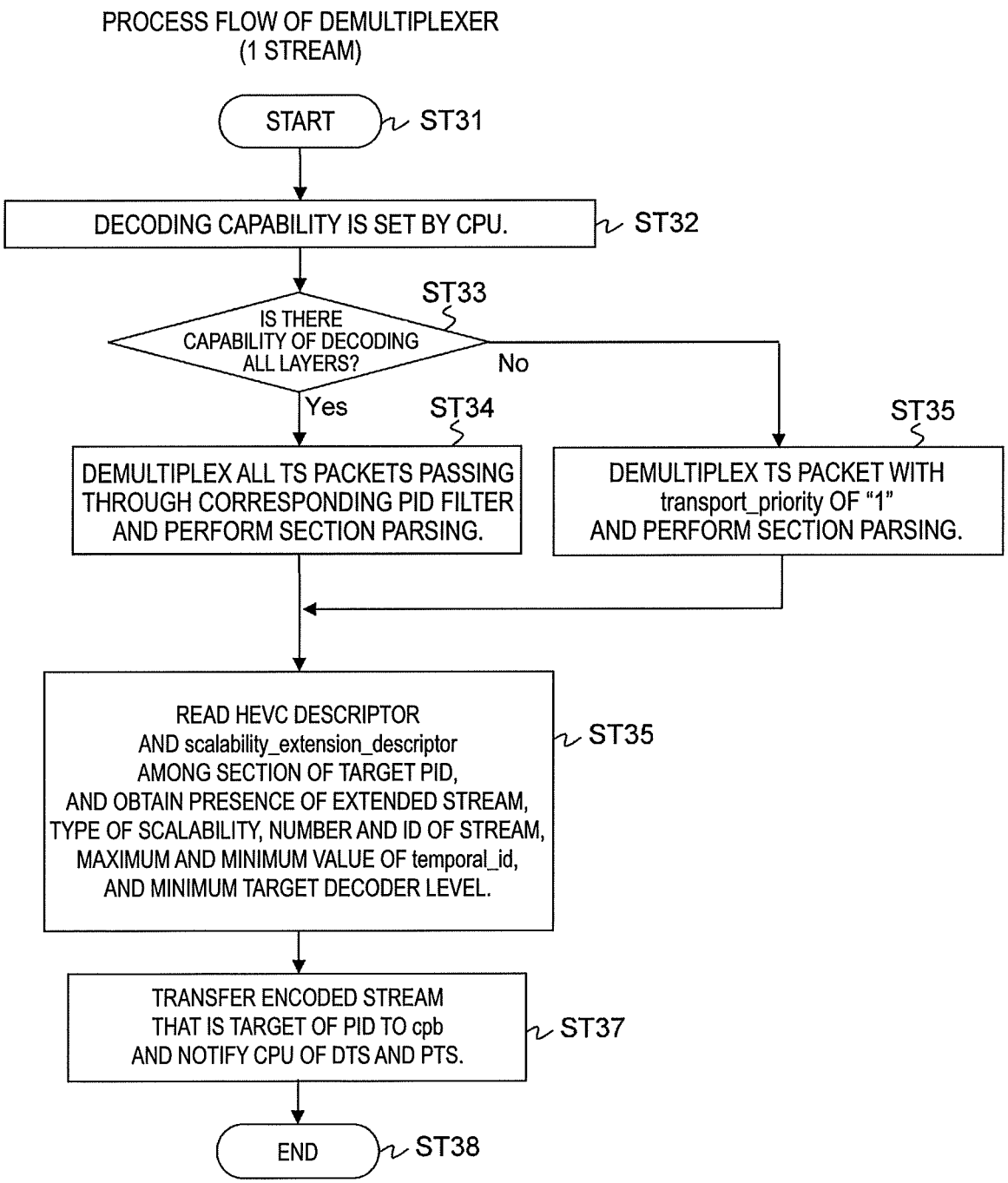
FIG. 31 is a diagram showing an example of a process flow (for one frame) of the demultiplexer.

FIG. 31 shows an example of a process flow of the demultiplexer 203. This process flow shows a case in which a transport stream TS includes a single video stream (encoded stream).

The demultiplexer 203 starts a process in Step ST31, and then moves to the process of Step ST32. In Step ST32, a decoding capability (decoder temporal layer capability) is set from the CPU 201. Next, the demultiplexer 203 determines whether or not there is a capability of decoding all layers in Step ST33.

When there is a capability of decoding all layers, the demultiplexer 203 demultiplexes all TS packets passing through a corresponding PID filter in Step ST34 to perform section parsing. Then, the demultiplexer 203 moves to the process of Step ST35.

When there is no capability of decoding all layers in Step ST33, the demultiplexer 203 demultiplexes a TS packet with "transport_priority" of "1" to perform section parsing in Step ST36. Then, the demultiplexer 203 moves to the process of Step ST35.

In Step ST35, the demultiplexer 203 reads the HEVC descriptor (HEVC_descriptor) and scalability extension descriptor (scalability_extension_descriptor) among sections of target PIDs, and obtains information on presence of an extended stream, the type of scalability, the number and IDs of streams, the maximum and minimum value of temporal_id, and the minimum target decoder level.

Next, the demultiplexer 203 transfers in ST37 an encoded stream for the PID to the compressed data buffer (cpb) 204 and notifies the CPU 201 of a DTS and PTS. After the process of Step ST37, the demultiplexer 203 finishes the process in Step ST38.

Figure 32:
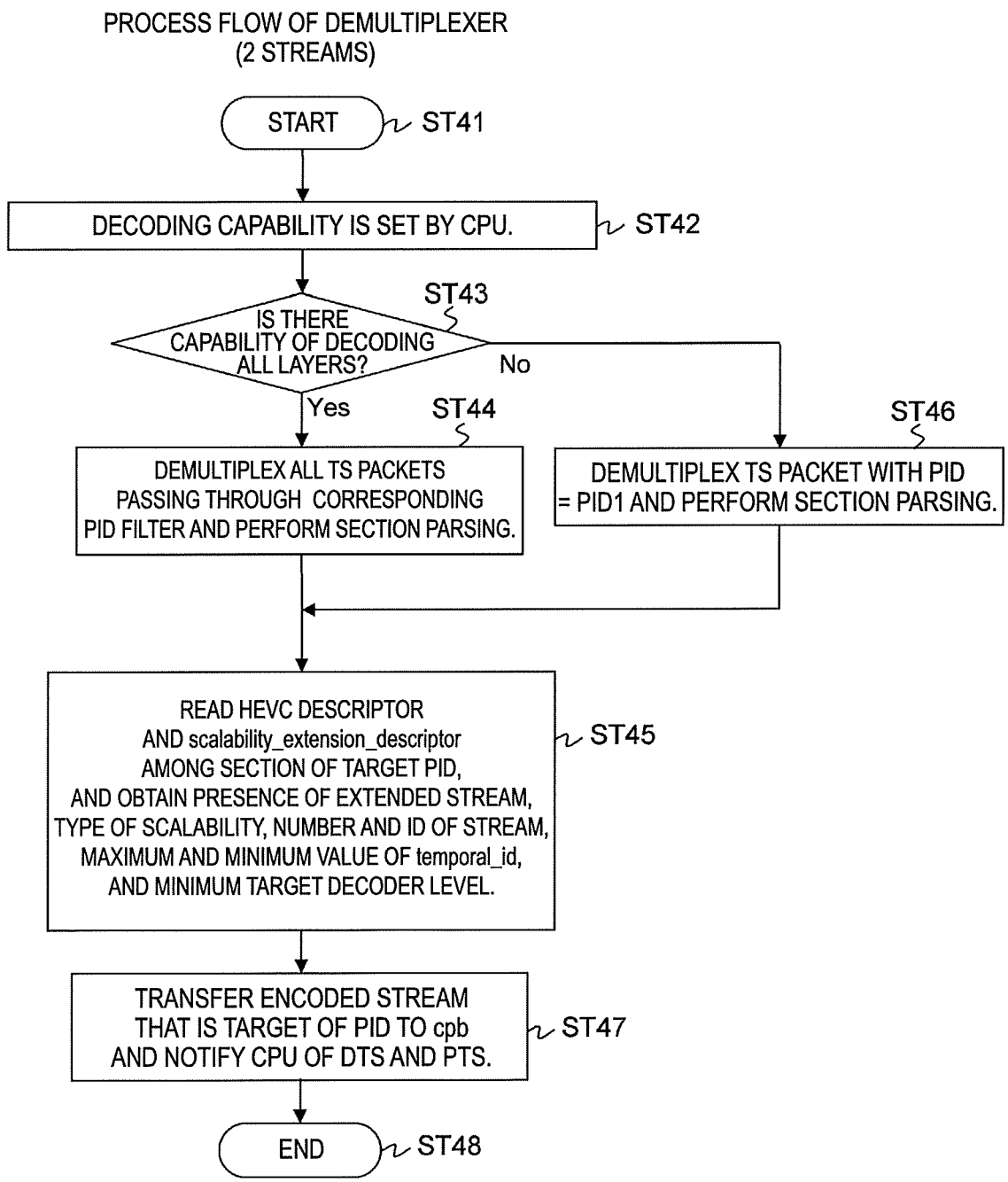
FIG. 32 is a diagram showing an example of a process flow (for two frames) of the demultiplexer.

FIG. 32 shows an example of another process flow of the demultiplexer 203. This process flow shows a case in which a transport stream TS includes two video streams (encoded streams) including a base stream and an extended stream.

The demultiplexer 203 starts a process in Step ST41, and then moves to the process of Step ST42. In Step ST42, a decoding capability (decoder temporal layer capability) is set from the CPU 201. Next, the demultiplexer 203 determines whether or not there is a capability of decoding all layers in Step ST43.

When there is a capability of decoding all layers, the demultiplexer 203 demultiplexes all TS packets passing through a corresponding PID filter in Step ST44 to perform section parsing. Then, the demultiplexer 203 moves to the process of Step ST45.

When there is no capability of decoding all layers in Step ST43, the demultiplexer 203 demultiplexes a TS packet with PID=PID1 to perform section parsing in Step ST46. Then, the demultiplexer 203 moves to the process of Step ST45.

In Step ST45, the demultiplexer 203 reads the HEVC descriptor (HEVC_descriptor) and scalability extension descriptor (scalability_extension_descriptor) among sections of target PIDs, and obtains information on presence of an extended stream, the type of scalability, the number and IDs of streams, the maximum and minimum value of temporal_id, and the minimum target decoder level.

Next, the demultiplexer 203 transfers in ST47 an encoded stream for the PID to the compressed data buffer (cpb) 204 and notifies the CPU 201 of a DTS and PTS. After the process of Step ST47, the demultiplexer 203 finishes the process in Step ST48.

Returning to FIG. 27, the compressed data buffer (cpb) 204 temporarily accumulates the video stream (encoded stream) taken from the demultiplexer 203. The decoder 205 takes out encoded image data of the pictures of a layer designated as a layer to be decoded from the video stream accumulated in the compressed data buffer 204. Then, the decoder 205 decodes the taken encoded image data of each picture at the decoding timing of the picture, and sends the data to the uncompressed data buffer (dpb) 206.

Here, in the decoder 205, the layer to be decoded is designated with temporal_id from the CPU 201. This layer designation is set to all layers included in the video stream (encoded stream) taken from the demultiplexer 203 or some layers on the low layer side automatically by the CPU 201 or according to a user operation. In addition, the CPU 201 gives the decoder 205 decoding timings based on the decoding time stamp (DTS). It should be noted that, when the decoder 205 decodes the encoded image data of each picture, the decoder reads and uses image data of a reference source picture from the uncompressed data buffer 206.

Figure 33:
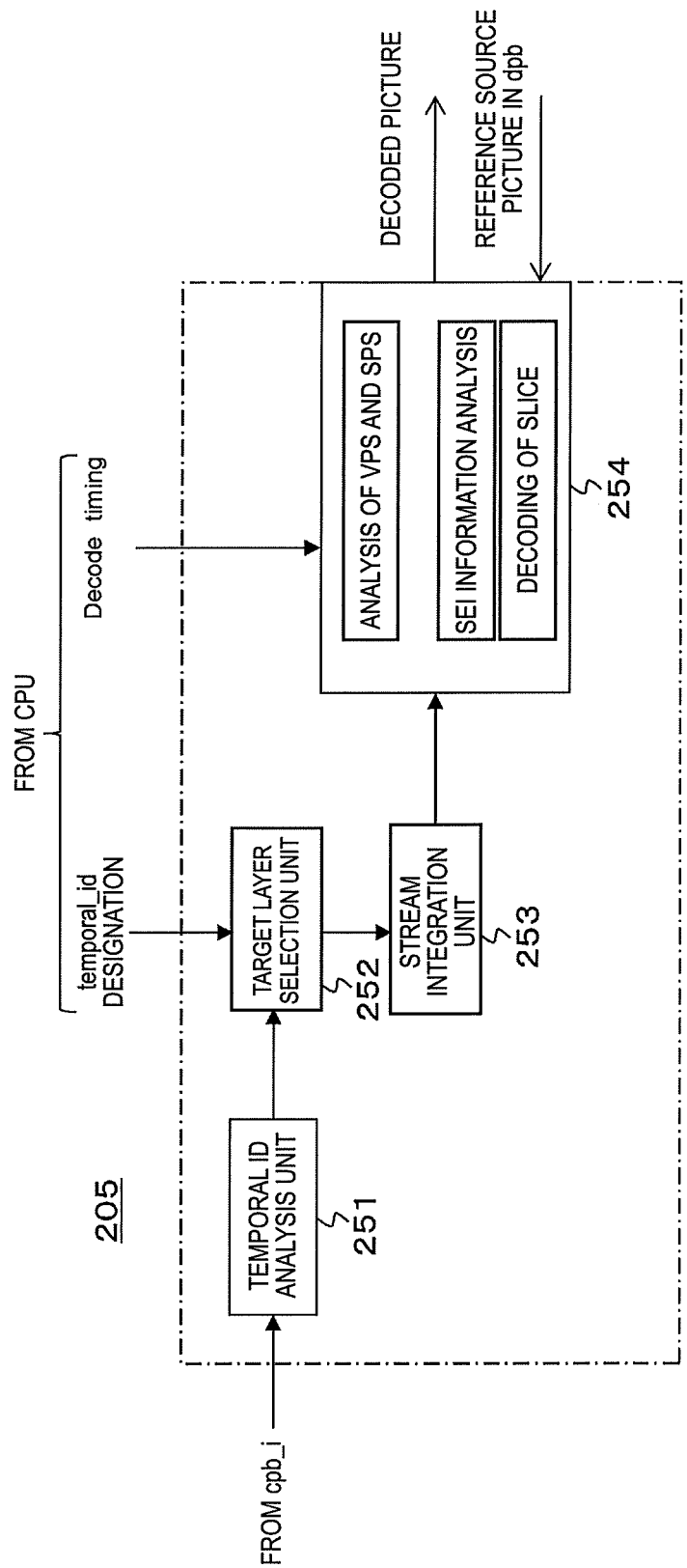
FIG. 33 is a block diagram showing a configuration example of a decoder.

FIG. 33 shows a configuration example of the decoder 205. This decoder 205 has a temporal ID analysis unit 251, a target layer selection unit 252, a stream integration unit 253, and a decoding unit 254. The temporal ID analysis unit 251 reads the video stream (encoded stream) accumulated in the compressed data buffer 204 and analyzes temporal_id inserted into the NAL unit header of the encoded image data of each picture.

The target layer selection unit 252 takes the encoded image, data of the pictures of the layer designated as a layer to be decoded from the video stream read from the compressed data buffer 204 based on the analysis result of the temporal ID analysis unit 251. In this case, the target layer selection unit 252 outputs one or a plurality of video streams (encoded streams) according to the number of video streams read from the compressed data buffer 204 and the designated layer.

The stream integration unit 253 integrates a predetermined number of video streams (encoded streams) output from the target layer selection unit 252 into one. The decoding unit 254 sequentially decodes encoded image data of each picture included in the video stream (encoded stream) integrated by the stream integration unit 253 at decoding timings and sends the data to the uncompressed data buffer (dpb) 206.

In this case, the decoding unit 254 discerns "general_level_idc," "sublayer_level_idc," and the like by analyzing the SPS and ESPS using level_constrained_flag obtained from the demultiplexer 203, and checks whether or not a stream or a substream can be decoded within the range of its own decoder processing capability. In addition, in this case, the decoding unit 254 analyzes SEI to discern, for example, "initial_cpb_removal_time" and "cpb_removal_delay," and checks whether the decoding timings from the CPU 201 is proper.

In addition, when decoding a slice, the decoding unit 254 acquires "ref_idx_10_active (ref_idx_11_active)" from the slice header as information indicating a prediction destination in the time direction to perform prediction in the time direction. It should be noted that decoded pictures are processed to be referred to by other pictures using "short_term_ref_pic_set_idx" or "it_idx_sps" obtained from the slice header as an index.

Figure 34:
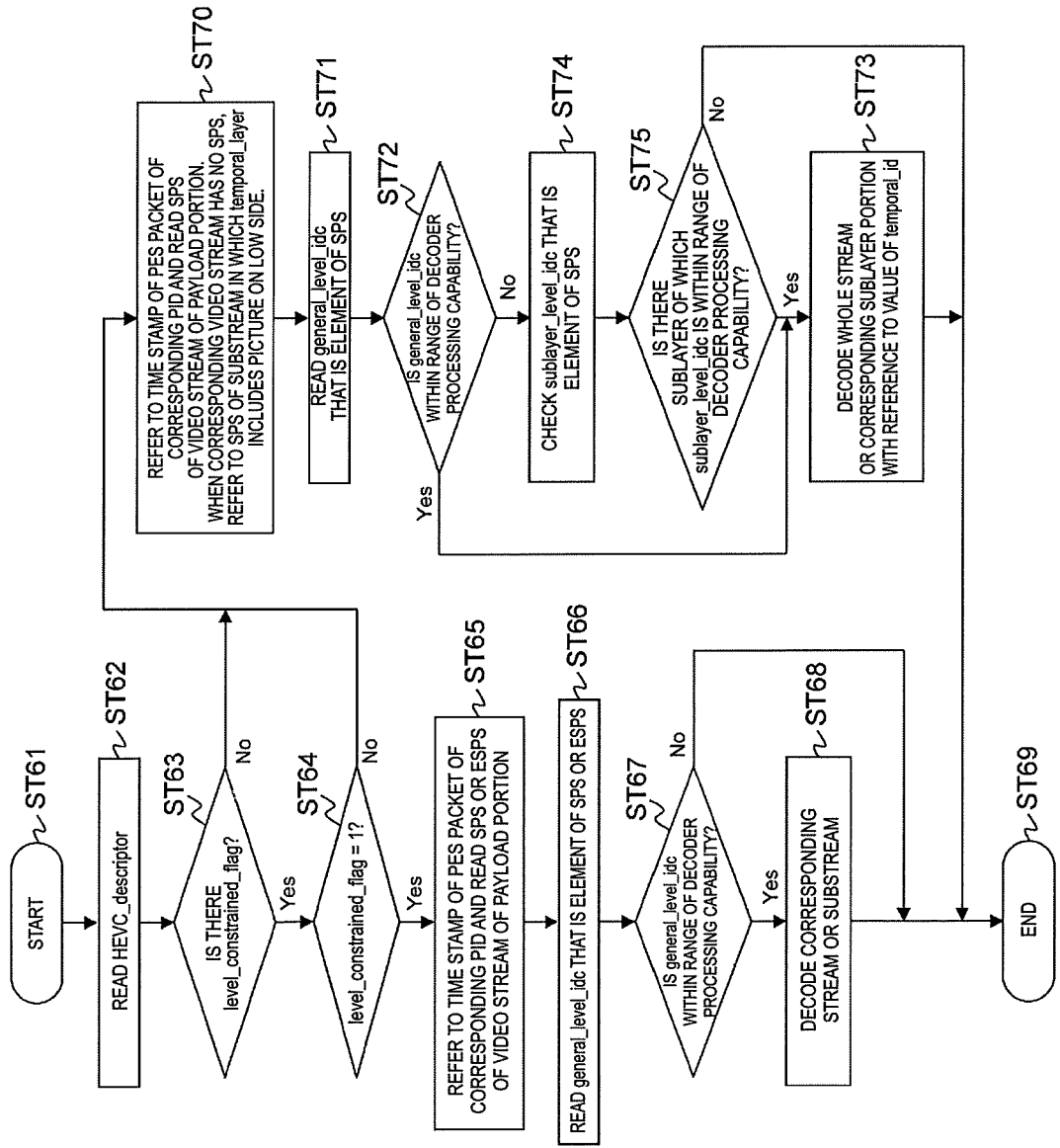
FIG. 34 is a flowchart showing an example of a decoding process procedure for each video stream in consideration of a decoder processing capability of a reception device.

The flowchart of FIG. 34 shows an example of a decoding process procedure for each video stream in consideration of a decoder processing capability of the reception device 200. The reception device 200 starts the process in Step ST61 and reads the HEVC descriptor (HEVC_descriptor) in Step ST62.

Next, the reception device 200 determines whether the HEVC descriptor includes "level_constrained_flag" in in Step ST63. When it is included, the reception device 200 determines whether "level_constrained_flag" is "1" in Step ST64. When it is "1," the reception device 200 moves to the process of Step ST65.

In Step ST65, the reception device 200 refers to the time stamp of a PES packet of the corresponding PID and reads the SPS or the ESPS of the video stream in the payload part. Then, the reception device 200 reads "general_level_idc" that is an element of the SPS or the ESPS in Step ST66.

Next, the reception device 200 determines whether "general_level_idc" is within the range of the decoder processing capability in Step ST67. When it is within the range of decoder processing capability, the reception device 200 decodes the corresponding stream or substream in Step ST68. Then, the reception device 200 finishes the process in Step ST69. On the other hand, when it is not in the range of the decoder processing capability in Step ST67, the reception device 200 directly proceeds to Step ST69, and finishes the process.

In addition, when "level_constrained_flag" is not included in Step ST63, or when "level_constrained_flag" is "0" in Step ST64, the reception device 200 moves to the process of Step ST70. In Step ST70, the reception device 200 refers to the time stamp of the PES packet of the corresponding PID and reads the SPS of the video stream in the payload part. On the other hand, when the corresponding video stream has no SPS, the SPS of the substream in which temporal_layer includes pictures on the low side is referred to.

Next, the reception device 200 reads "general_level_idc" that is an element of the SPS in Step ST71. Then, the reception device 200 determines whether "general_level_idc" is within the range of the decoder processing capability in Step ST72. When it is within the range of the decoder processing capability, the reception device 200 moves to the process of Step ST73.

On the other hand, when it is not within the range of the decoder processing capability, the reception device 200 checks "sublayer_level_idc" that is an element of the SPS in Step ST74. Then, the reception device 200 determines whether there is a "sublayer" of which "sublayer_level_idc" is within the range of the decoder processing capability in Step ST75. When there is none, the reception device 200 directly proceeds to Step ST69 and the process ends. On the other hand, when there is one, the reception device 200 moves to the process of Step ST73.

In Step ST73, the reception device 200 decodes the entire stream or the sublayer part referring to the value of temporal_id. Then, the reception device 200 finishes the process in Step ST69.

Returning to FIG. 27, the uncompressed data buffer (dpb) 206 temporarily stores the image data of each picture decoded by the decoder 205. The post-processing unit 207 performs a process on the image data of each of the pictures sequentially read from the uncompressed data buffer (dpb) 206 at display timings to cause the frame rate thereof to match a display capability. In this case, the display timings are given from the CPU 201 based on a presentation time stamp (PTS).

For example, when the frame rate of the decoded image data of the pictures is 120 fps and the display capability is 120 fps, the post-processing unit 207 sends the decoded image data of the pictures to a display as it is. In addition, when, for example, the frame rate of the decoded image data of the pictures is 120 fps and the display capability is 60 fps, the post-processing unit 207 performs a subsampling process so that time-direction resolution is half that of the decoded image data of the pictures, and sends the data to the display as image data of 60 fps.

In addition, when the frame rate of the decoded image data of the pictures is 60 fps and the display capability is 120 fps, the post-processing unit 207 performs an interpolation process so that time-direction resolution is twice the decoded image data of the pictures, and sends the data to the display as image data of 120 fps. In addition, when, for example, the frame rate of the decoded image data of the pictures is 60 fps and the display capability is 60 fps, the post-processing unit 207 sends the decoded image data of the pictures to the display as it is.

Figure 35:
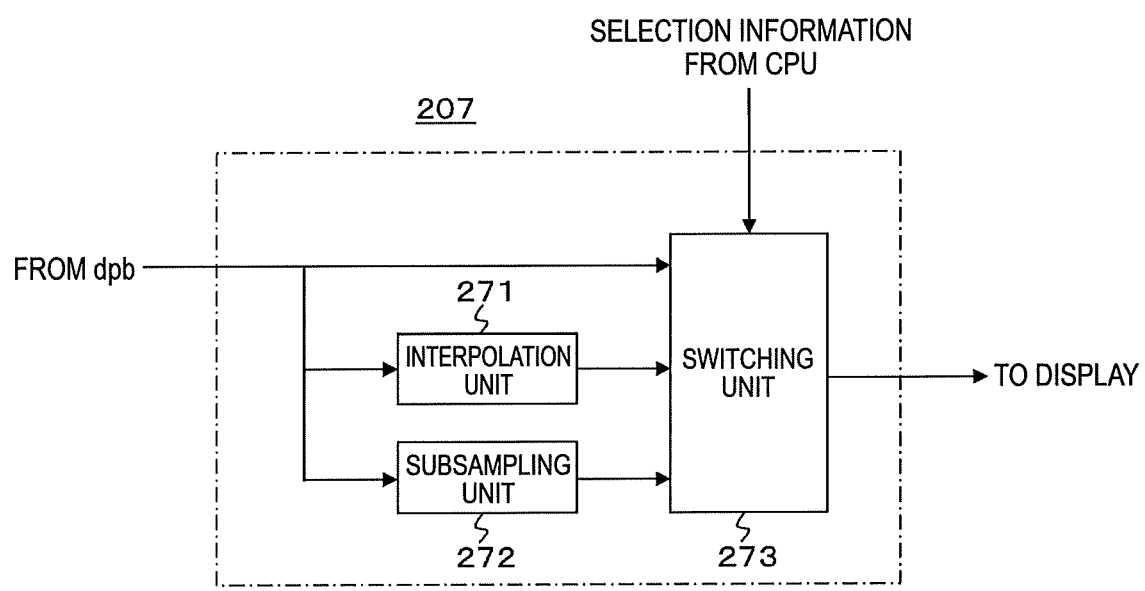
FIG. 35 is a diagram showing a configuration example of a post-processing unit.

FIG. 35 shows a configuration example of the post-processing unit 270. This is an example which can deal with the case described above in which the frame rate of the decoded image data of the pictures is 120 fps or 60 fps and the display capability is 120 fps or 60 fps, The post-processing unit 207 has an interpolation unit 271, a subsampling unit 272, and a switching unit 273. The decoded image data of the pictures from the uncompressed data buffer 206 is input directly to the switching unit 273 or input to the switching unit 273 after passing through the interpolation unit 271 to have twice the frame rate, or input to the switching unit 273 after passing through the subsampling unit 272 to have half the frame rate.

The switching unit 273 receives supply of selection information from the CPU 201. The CPU 201 generates this selection information automatically with reference to the display capability or according to a user operation. The switching unit 273 selectively outputs any of the inputs based on the selection information. Accordingly, the frame rate of the image data of the pictures sequentially read from the uncompressed data buffer (dpb) 206 at the display timings matches the display capability.

Figure 36:
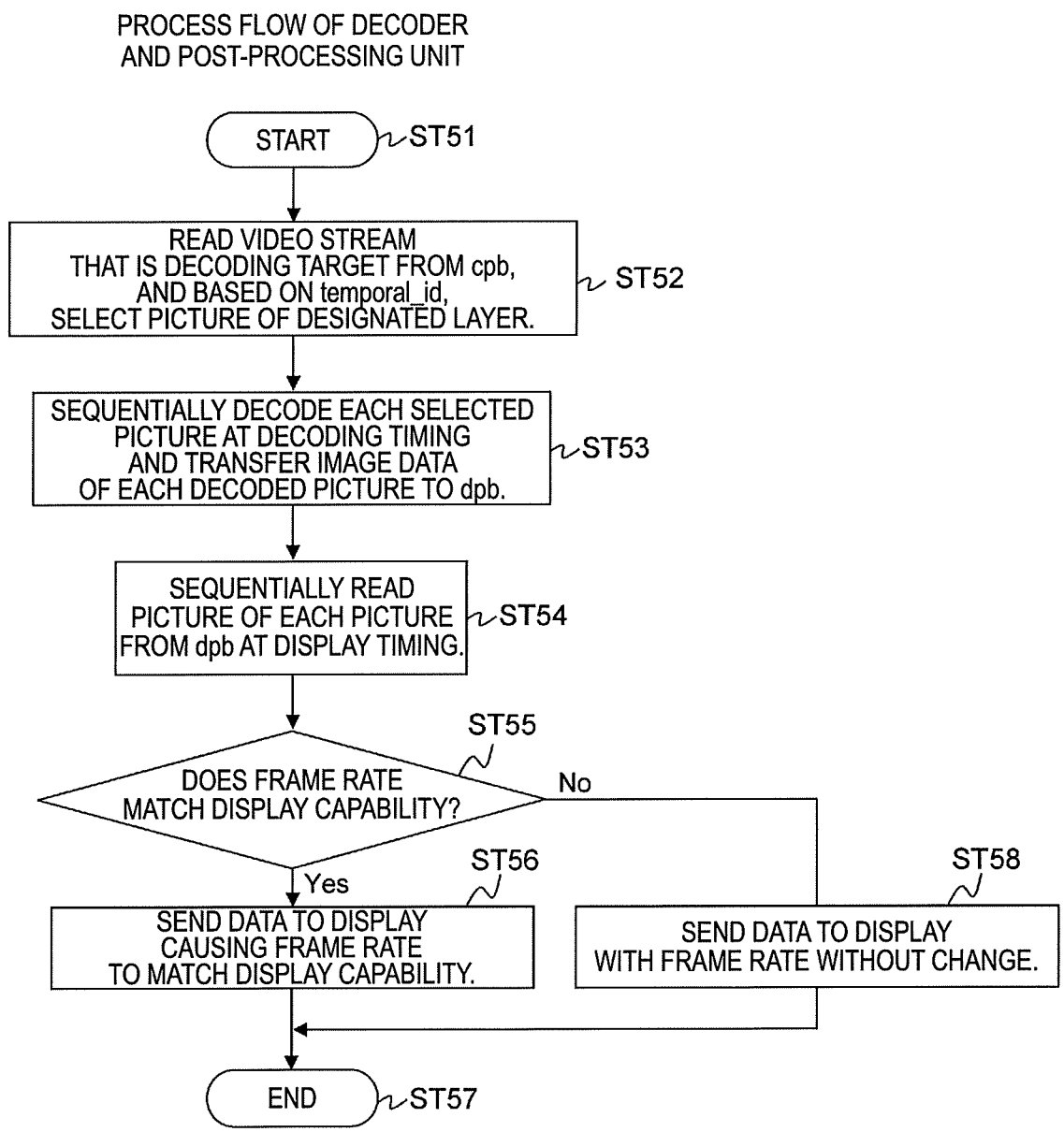
FIG. 36 is a diagram showing an example of a process flow of the decoder and the post-processing unit.

FIG. 36 shows an example of a process flow of the decoder 205 and the post-processing unit 207. The decoder 205 and the post-processing unit 207 start the process in Step ST51. Then, they move to the process of Step ST52. In Step ST52, the decoder 205 reads a video stream to be decoded accumulated in the compressed data buffer (cpb) 204 and selects pictures of a layer designated as a decoding target from the CPU 201 based on temporal_id.

Next, the decoder 205 sequentially decodes encoded image data of the selected pictures at decoding timings, and transfers the decoded image data of the pictures to the uncompressed data buffer (dpb) 206 to cause the data to be temporarily stored in Step ST53. Next, the post-processing unit 207 reads the image data of the pictures from the uncompressed data buffer (dpb) 206 at a display timing in Step ST54.

Next, the post-processing unit 207 determines whether or not the frame rate of the read image data of the pictures matches the display capability. When the frame rate does not match the display capability, the post-processing unit 207 causes the frame rate to match the display capability in Step ST56 and sends the data to the display, and then finishes the process in Step ST57. On the other hand, when the frame rate matches the display capability, the post-processing unit 207 sends the data with the frame rate to the display without change in Step ST58, and then finishes the process in Step ST57.

An operation of the reception device 200 shown in FIG. 27 will be briefly described. The reception unit 202 demodulates an RF modulation signal received with a reception antenna to acquire a transport stream TS. This transport stream TS is sent to the demultiplexer 203. The demultiplexer 203 selectively takes encoded image data of pictures of a layer set from the transport stream TS according to a decoding capability (decoder temporal layer capability), and sends the data to the compressed data buffer (cpb) 204 to cause the data to be temporarily stored.

The decoder 205 takes the encoded image data of the pictures of the layer designated as a layer to be decoded from the video stream accumulated in the compressed data buffer 204. Then, the decoder 205 decodes the encoded image data of each of the taken pictures at decoding timings of the pictures, and sends the data to the uncompressed data buffer (dpb) 206 to cause the data to be temporarily stored. In this case, when the encoded image data of the respective pictures is to be decoded, image data of a reference source picture is read from the uncompressed data buffer 206 to be used.

The image data of the pictures sequentially read from the uncompressed data buffer (dpb) 206 at display timings is sent to the post-processing unit 207. The post-processing unit 207 performs interpolation or subsampling to cause the frame rate of the image data of the pictures to match the display capability. The image data of the pictures processed by the post-processing unit 207 is supplied to the display and a dynamic image of the image data of the pictures is displayed.

As described above, on the reception side in the transmission and reception system 10 shown in FIG. 1, an encoding interval is computed for each layer, and a decoding time stamp that is set such that a higher layer has a shorter decoding time interval of encoded image data of each picture is added to the encoded image data of the pictures of each layer. For this reason, the reception side can perform, for example, a favorable decoding process according to a decoding capability. Even in the case of a low decoding capability, for example, it is possible to selectively decode encoded image data of pictures of a low layer set without incurring a failure of the compressed data buffer 204.

In addition, on the transmission side in the transmission and reception system 10 shown in FIG. 1, a scalability extension descriptor (scalability_extension_descriptor) or the like is inserted into a layer of a transport stream TS. For this reason, the reception side can easily ascertain, for example, layer information of hierarchical encoding, configuration information of the video stream included in the transport stream TS, and the like and thereby can perform a proper decoding process.

In addition, in the transmission and reception system 10 shown in FIG. 1, the transmission unit divides a plurality of layers into a predetermined number of layer sets, the number being equal to or greater than two, and a higher priority of a TS packet which contains encoded image data of pictures of a layer set on the lower layer side is set. In the case of two divisions, for example, the 1-bit field of "transport_priority" is set to "1" for a TS packet which contains encoded image data of pictures of a layer set on the base layer side, i.e., the low layer side, and to "0" for a TS packet which contains encoded image data of pictures of a layer set on the non-base layer side, i.e., the high layer side. For this reason, the reception side can only put encoded image data of a layer set commensurate with its own decoding capability into the compressed data buffer (cpb) 204 based on the priority of this TS packet, and thus a buffer failure can be easily avoided.

In addition, in the transmission and reception system 10 shown in FIG. 1, the transmission side inserts a level designation value of a bitstream into substreams corresponding to each layer set, and the value is assumed to be the value of a level which includes pictures of all layers that are included in a layer set equal to or lower than the corresponding layer set. For this reason, the reception side of the video stream can easily determine whether or not decoding of each of the substreams is possible based on the level designation value of the inserted bitstream.

In addition, in the transmission and reception system 10 shown in FIG. 1, the transmission side inserts flag information (level_constrained_flag) indicating that the level designation value of the bitstream inserted into the substreams of each layer set is the value of a level which includes pictures of all layers that are included in layer sets from the corresponding and lower layer sets into the layer of the transport stream TS (a layer of a container). For this reason, with this flag information, the reception side acknowledges that the level designation value of the bitstream inserted into the substreams of each layer set is the value of a level which includes pictures of all layers that are included in layer sets from the corresponding and lower layer sets, thereby a checking process using sublayer_level_idc is unnecessary, and efficiency of a decoding process can be achieved.

2. Modified Example

It should be noted that, although the above-described embodiment shows the transmission and reception system 10 constituted by the transmission device 100 and the reception device 200, a configuration of a transmission and reception system to which the present technology can be applied is not limited thereto. For example, the reception device 200 part may be configured with, for example, a set-top box connected with a digital interface such as High-Definition Multimedia Interface (HDMI) and a monitor, or the like.

In addition, the above-described embodiment shows the example in which the container is a transport stream (MPEG-2 TS). The present technology, however, can also be similarly applied to a system configured to distribute data to a reception terminal using a network such as the Internet. In distribution on the Internet, there are many cases of distribution using a container in MP4 or other formats. In other words, as containers, various formats including transport streams (MPEG-2 TS) employed in digital broadcasting standards, MP4 used in Internet distribution, and the like are equivalent thereto.

Additionally, the present technology may also be configured as below.

(1)

A transmission device including:

an image encoding unit configured to classify image data of each of pictures which constitute dynamic image data into a plurality of layers, to encode image data of pictures of each of the classified layers, and to generate a video stream having the encoded image data of the pictures of each of the layers; and a transmission unit configured to transmit a container in a predetermined format which includes the generated video stream, wherein the image encoding unit adds decoding timing information, which has been set in a manner that a higher layer has a shorter decoding time interval of the encoded image data of each of the pictures, to the encoded image data of the pictures of each of the layers.

(2)

The transmission device according to (1), wherein the image encoding unit generates a single video stream having the encoded image data of the pictures of each of the layers, and divides the plurality of layers into a predetermined number of layer sets, the number being equal to or greater than two, and adds identification information for identifying an affiliated layer set to encoded image data of pictures of each of the layer sets.

(3)

The transmission device according to (2), wherein the identification information is a level designation value of a bitstream and a higher value is set for a layer set on a higher layer side.

(4)

The transmission device according to (1), wherein the image encoding unit divides the plurality of layers into a predetermined number of layer sets, the number being equal to or greater than two, and generates the predetermined number of video streams having encoded image data of pictures of each of the layer sets.

(5)

The transmission device according to (4), wherein the image encoding unit adds identification information for identifying an affiliated layer set to the encoded image data of the pictures of each of the layer sets.

(6)

The transmission device according to (5), wherein the identification information is a level designation value of a bitstream and a higher value is set for a layer set on a higher layer side.

(7)

The transmission device according to any of (1) to (6), wherein the image encoding unit generates a single video stream having the encoded image data of the pictures of each of the layers or divides the plurality of layers into a predetermined number of layer sets, the number being equal to or greater than two, and generates the predetermined number of video streams having encoded image data of pictures of each of the layer sets, and further includes an information insertion unit configured to insert configuration information of a video stream included in the container into a layer of the container.

(8)

The transmission device according to any of (1) to (8), wherein the transmission unit divides the plurality of layers into a predetermined number of layer sets, the number being equal to or greater than two, and sets a higher priority of a packet which contains encoded image data of pictures of a layer set on a lower layer side.

(9)

A transmission method including:

an image encoding step of classifying image data of each of pictures which constitute dynamic image data into a plurality of layers, encoding image data of pictures of each of the classified layers, and generating a video stream having the encoded image data of the pictures of each of the layers; and a transmission step by a transmission unit of transmitting a container in a predetermined format which includes the generated video stream, wherein, in the image encoding step, decoding timing information, which has been set in a manner that a higher layer has a shorter decoding time interval of the encoded image data of each of the pictures, is added to the encoded image data of the pictures of each of the layers.

(10)

A reception device including:

a reception unit configured to receive a container in a predetermined format which includes a video stream having encoded image data of pictures of each of layers which is obtained by classifying image data of each of the pictures which constitute dynamic image data into a plurality of layers and encoding the image data, wherein decoding timing information that is set in a manner that a higher layer has a shorter decoding time interval of the encoded image data of each of the pictures is added to the encoded image data of the pictures of each of the layers, and wherein the reception device further includes a processing unit configured to obtain, by decoding encoded image data of pictures of a layer equal to or lower than a predetermined layer selected from the video stream included in the received container at a decoding timing indicated by the decoding timing information, image data of the pictures of the layer equal to or lower than the predetermined layer.

(11)

The reception device according to (10), wherein the received container includes a single video stream having the encoded image data of the pictures of each of the layers, wherein the plurality of layers are divided into a predetermined number of layer sets, the number being equal to or greater than two, and a higher priority of a packet which contains encoded image data of pictures of a layer set on a lower layer side is set, and wherein the processing unit puts encoded image data of pictures of a predetermined layer set contained in a packet with a priority selected according to a decoding capability in a buffer to decode the encoded image data.

(12)

The reception device according to (10), wherein the received container includes a predetermined number of video streams, the number being equal to or greater than two, having encoded image data of pictures of the predetermined number of layer sets obtained by dividing the plurality of layers, and wherein the processing unit puts encoded image data of pictures of a predetermined layer set included in a video stream selected according to a decoding capability in a buffer to decode the encoded image data.

(13)

The reception device according to any of (10) to (12), further including a post-processing unit configured to cause a frame rate of image data of each picture obtained by the processing unit to match a display capability.

(14)

A reception method including:

a reception step by a reception unit of receiving a container in a predetermined format which includes a video stream having encoded image data of pictures of each of layers which is obtained by classifying image data of each of the pictures which constitute dynamic image data into a plurality of layers and encoding the image data, wherein decoding timing information that is set in a manner that a higher layer has a shorter decoding time interval of the encoded image data of each of the pictures is added to the encoded image data of the pictures of each of the layers, and wherein the reception method further includes a processing step of obtaining, by decoding encoded image data of pictures of a layer equal to or lower than a predetermined layer selected from the video stream included in the received container at a decoding timing indicated by the decoding timing information, image data of the pictures of the layer equal to or lower than the predetermined layer.

(15)

A transmission device including:

an image encoding unit configured to classify image data of each of pictures constituting dynamic image data into a plurality of layers, encode image data of pictures of each of the classified layers, and generate a video stream having the encoded image data of the pictures of each of the layers; and a transmission unit configured to transmit a container in a predetermined format which includes the generated video stream, wherein the image encoding unit generates a single video stream having the encoded image data of the pictures of each of the layers or divides the plurality of layers into a predetermined number of layer sets, the number being equal to or greater than two, and generates the predetermined number of video streams having encoded image data of pictures of each of the layer sets, and further includes an information insertion unit configured to insert configuration information of a video stream included in the container into a layer of the container.

(16)

A transmission device including:

an image encoding unit configured to classify image data of each of pictures constituting dynamic image data into a plurality of layers, encode image data of pictures of each of the classified layers, and generate a video stream having the encoded image data of the pictures of each of the layers; and a transmission unit configured to transmit a container in a predetermined format which includes the generated video stream, wherein the transmission unit divides the plurality of layers into a predetermined number of layer sets, the number being equal to or greater than two, and sets a higher priority of a packet which contains encoded image data of pictures of a layer set on a lower layer side.

(17)

An encoding device including:

an image encoding unit configured to classify image data of each of pictures constituting dynamic image data into a plurality of layers, encode image data of pictures of each of the classified layers, and generate a video stream having the encoded image data of the pictures of each of the layers, wherein the image encoding unit divides the plurality of layers into a predetermined number of layer sets, the number being equal to or greater than two, and inserts a level designation value of a bitstream into substreams corresponding to each of the layer sets, and wherein the level designation value of the bitstream inserted into the substreams corresponding to each of the layer sets is set to be a value of a level which includes pictures of all layers included in a layer set equal to or lower than a corresponding layer set.

(18)

The encoding device according to (17), wherein the image encoding unit generates the predetermined number of video streams including the substreams corresponding to each of the layer sets, or generates a single video stream which includes all substreams corresponding to each of the layer sets.

(19)

An encoding method including:

an image encoding step by an image encoding unit of classifying image data of each of pictures constituting dynamic image data into a plurality of layers, encoding image data of pictures of each of the classified layers, and generating a video stream having the encoded image data of the pictures of each of the layers, wherein, in the image encoding step, the plurality of layers are divided into a predetermined number of layer sets, the number being equal to or greater than two, and a level designation value of a bitstream is inserted into substreams corresponding to each of the layer sets, and wherein the level designation value of the bitstream inserted into the substreams corresponding to each of the layer sets is set to be a value of a level which includes pictures of all layers included in a layer set equal to or lower than a corresponding layer set.

(20)

A transmission device including:

an image encoding unit configured to classify image data of each of pictures constituting dynamic image data into a plurality of layers, encode image data of pictures of each of the classified layers, and generate a video stream having the encoded image data of the pictures of each of the layers, wherein the image encoding unit divides the plurality of layers into a predetermined number of layer sets, the number being equal to or greater than two, and inserts a level designation value of a bitstream into substreams corresponding to each of the layer sets, wherein the level designation value of the bitstream inserted into the substreams corresponding to each of the layer sets is set to be a value of a level which includes pictures of all layers included in a layer set equal to or lower than the layer set, and wherein the transmission device further includes a transmission unit configured to transmit a container in a predetermined format which includes the generated video stream, and an information insertion unit configured to insert, into a layer of the container, flag information which indicates that the level designation value of the bitstream inserted into the substreams of each of the layer sets is the value of the level which includes the pictures of all layers included in the layer set equal to or lower than the layer set.

A main characteristic of the present technology is that, by computing an encoding interval for each layer and adding a decoding time stamp, which is set such that a higher layer has a shorter decoding time interval of encoded image data of each picture, to the encoded image data of the pictures of each layer, a reception side can perform a favorable decoding process according to its decoding performance (see FIG. 9). In addition, another main characteristic of the present technology is that, by dividing a plurality of layers into a predetermined number of layer sets, the number being equal to or greater than two, and setting a higher priority of a packet which contains encoded image data of pictures of a layer set on the lower layer side, the reception side only puts the encoded image data of pictures of a layer set commensurate with its decoding capability into a buffer based on the priority and thereby a buffer failure can be avoided (see FIG. 19).

REFERENCE SIGNS LIST 10 transmission and reception system
100 transmission device
101 CPU
102 encoder
103 compressed data buffer (cpb)
104 multiplexer
105 transmission unit
121 temporal ID generation unit
122 buffer delay control unit
123 HRD setting unit
124 parameter set/SEI encoding unit
125 slice encoding unit
126 NAL packetizing unit
141 TS priority generation unit
142 section coding unit
143-1 to 143-N PES packetizing unit
144 transport packetizing unit
200 reception device
201 CPU
202 reception unit
203 demultiplexer
204 compressed data buffer (cpb)
205 decoder
206 uncompressed data buffer (dpb)
207 post-processing unit
231 PCR extraction unit
232 time stamp extraction unit
233 section extraction unit
234 TS priority extraction unit
235 PES payload extraction unit
236 picture selection unit
251 temporal ID analysis unit
252 target layer selection unit
253 stream integration unit
254 decoding unit
271 interpolation unit
272 subsampling unit
273 switching unit

The invention claimed is:

1. A transmission device comprising:
circuitry configured to
encode image data of pictures of a low layer side and a high layer side to form encoded image data, wherein the encoded image data of each layer includes information for identifying a layer to which the encoded image data belongs, and
a decoding time stamp is given to encoded image data of each picture, the decoding time stamp indicating that decoding timings of the encoded image data of pictures of the high layer side are set between decoding timings of the encoded image data of pictures of the low layer side such that the decoding timings of the encoded image data of the pictures of the high layer side are each alternated with the decoding timings of the encoded image data of the pictures of the low layer side;
prepare a description that includes a first information indicating a level designation value of the encoded image data of pictures of the low layer side and a second information indicating a level designation value of the encoded image data of pictures of the low layer side and the high layer side; and
transmit the description and the encoded image data.

2. The transmission device according to claim 1, wherein the circuitry is configured to transmit the encoded image data of the pictures of the low layer side and the pictures of the high layer side in a single video stream.

3. The transmission device according to claim 1, wherein the circuitry is configured to transmit the encoded image data as two video streams which are a base stream having the encoded image data of the pictures of the low layer side and an enhanced stream having the encoded image data of the pictures of the high layer side.

4. A reception device comprising:
circuitry configured to
receive a description and encoded image data of pictures of a low layer side and a high layer side, wherein
the description includes a first information indicating a level designation value of the encoded image data of pictures of the low layer side and a second information indicating a level designation value of the encoded image data of pictures of the low layer side and the high layer side,
the encoded image data of each layer includes information for identifying a layer to which the encoded image data belongs, and
a decoding time stamp is given to encoded image data of each picture, the decoding time stamp indicating that decoding timings of the encoded image data of pictures of the high layer side are set between decoding timings of the encoded image data of pictures of the low layer side such that the decoding timings of the encoded image data of the pictures of the high layer side are each alternated with the decoding timings of the encoded image data of the pictures of the low layer side,
decode encoded image data of pictures from a lowest layer to a specified layer on the basis of the description, and
set a frame rate of the decoded image data on the basis of selection information which is generated automatically or according to a user operation.

5. The reception device according to claim 4, wherein the circuitry is configured to set the specified layer automatically or according to a user operation.

6. The reception device according to claim 4, wherein the circuitry is configured to match the frame rate of the decoded image data with a display capability.

7. The reception device according to claim 4, wherein the circuitry is configured to receive the encoded image data of the pictures of the low layer side and the pictures of the high layer side in a single video stream.

8. The reception device according to claim 4, wherein the circuitry is configured to receive the encoded image data as two video streams which are a base stream having the encoded image data of the pictures of the low layer side and an enhanced stream having the encoded image data of the pictures of the high layer side.

9. A reception method comprising:
receiving, using circuitry, a description and encoded image data of pictures of a low layer side and a high layer side, wherein
the description includes a first information indicating a level designation value of the encoded image data of pictures of the low layer side and a second information indicating a level designation value of the encoded image data of pictures of the low layer side and the high layer side,
the encoded image data of each layer includes information for identifying a layer to which the encoded image data belongs, and
a decoding time stamp is given to encoded image data of each picture, the decoding time stamp indicating that decoding timings of the encoded image data of pictures of the high layer side are set between decoding timings of the encoded image data of pictures of the low layer side such that the decoding timings of the encoded image data of the pictures of the high layer side are each alternated with the decoding timings of the encoded image data of the pictures of the low layer side;
decoding, using the circuitry, encoded image data of pictures from a lowest layer to a specified layer on the basis of the description; and
setting, using the circuitry, a frame rate of the decoded image data on the basis of selection information which is generated automatically or according to a user operation.

10. The reception method according to claim 9, comprising setting the specified layer automatically or according to a user operation.

11. The reception method according to claim 9, comprising matching the frame rate of the decoded image data with a display capability.

12. The reception method according to claim 9, comprising receiving the encoded image data of the pictures of the low layer side and the pictures of the high layer side in a single video stream.

13. The reception method according to claim 9, comprising receiving the encoded image data as two video streams which are a base stream having the encoded image data of the pictures of the low layer side and an enhanced stream having the encoded image data of the pictures of the high layer side.

* * * * *